US008275667B1

(12) United States Patent
Goel

(10) Patent No.: US 8,275,667 B1
(45) Date of Patent: Sep. 25, 2012

(54) SYSTEM FOR CONCURRENT OPTIMIZATION OF BUSINESS ECONOMICS AND CUSTOMER VALUE SATISFACTION

(76) Inventor: Sachin Goel, Walpole, MA (US)

(*) Notice: Subject to any disclaimer, the term of this patent is extended or adjusted under 35 U.S.C. 154(b) by 664 days.

(21) Appl. No.: 11/981,716

(22) Filed: Oct. 31, 2007

Related U.S. Application Data

(63) Continuation of application No. 10/973,802, filed on Oct. 25, 2004, now Pat. No. 7,418,409.

(60) Provisional application No. 60/514,248, filed on Oct. 24, 2003.

(51) Int. Cl.
*G06Q 30/00* (2012.01)
(52) U.S. Cl. ............... 705/26.1; 705/5; 705/6; 705/26.7
(58) Field of Classification Search ........... 705/26–27.2, 705/80, 5–6
See application file for complete search history.

(56) References Cited

U.S. PATENT DOCUMENTS

| | | | |
|---|---|---|---|
| 4,775,936 A | 10/1988 | Jung | |
| 4,931,932 A | 6/1990 | Dalnekoff et al. | |
| 5,237,499 A | 8/1993 | Garback | |
| 5,627,973 A | 5/1997 | Armstrong et al. | |
| 5,765,142 A | 6/1998 | Allred et al. | |
| 5,797,127 A | 8/1998 | Walker et al. | |
| 5,890,133 A | 3/1999 | Ernst | |
| 5,897,620 A * | 4/1999 | Walker et al. ............ | 705/5 |
| 5,962,829 A | 10/1999 | Yoshinaga | |
| 5,963,910 A | 10/1999 | Ulwick | |
| 6,014,647 A | 1/2000 | Nizzari et al. | |
| 6,041,308 A | 3/2000 | Walker et al. | |
| 6,107,932 A | 8/2000 | Walker et al. | |
| 6,115,691 A | 9/2000 | Ulwick | |

(Continued)

FOREIGN PATENT DOCUMENTS

GB 2366403 A 3/2002

(Continued)

OTHER PUBLICATIONS

Taking the first step Nora Wood. Incentive. New York: Sep. 1997. vol. 171, Iss. 9; p. 42, 2 pgs.*

(Continued)

*Primary Examiner* — William Allen
(74) *Attorney, Agent, or Firm* — Wolf, Greenfield & Sacks, P.C.

(57) ABSTRACT

A method of dynamically formulating value options that maximize customer satisfaction and company profitability includes identifying a set of demand segments for a company, each demand segment having a satisfaction value. The method further includes identifying a set of demand options falling under each of the demand segments for each product offered by the company, each demand option having a preference value. Whenever a customer demands a product, the method further includes interacting with the customer in a structured manner to determine advanced and ongoing preferences of the customer for the product. The method further includes setting the preference value of each demand option based on the advanced and ongoing preferences of the customer for the product demanded by the customer. The method further includes formulating a set of value options that satisfy the customer demand. Each value option has a set of demand options and a customer satisfaction value based on an aggregate of individual satisfaction values for the demand segments and the company profitability in satisfying the demand options in the value option. The satisfaction value of each demand segment is based on the preference values of the demand options satisfied within the demand segment.

19 Claims, 25 Drawing Sheets

U.S. PATENT DOCUMENTS

| | | | |
|---|---|---|---|
| 6,119,094 | A | 9/2000 | Lynch et al. |
| 6,119,933 | A | 9/2000 | Wong et al. |
| 6,161,051 | A | 12/2000 | Hafemann et al. |
| 6,236,977 | B1 | 5/2001 | Verba et al. |
| 6,263,315 | B1 | 7/2001 | Talluri |
| 6,295,521 | B1 | 9/2001 | DeMarcken et al. |
| 6,304,850 | B1 | 10/2001 | Keller et al. |
| 6,307,572 | B1 | 10/2001 | DeMarcken et al. |
| 6,314,361 | B1 | 11/2001 | Yu et al. |
| 6,356,878 | B1 * | 3/2002 | Walker et al. ............ 705/26.81 |
| 6,377,932 | B1 | 4/2002 | DeMarcken |
| 6,442,537 | B1 | 8/2002 | Karch |
| 6,477,520 | B1 | 11/2002 | Malaviya et al. |
| 6,496,568 | B1 | 12/2002 | Nelson |
| 6,567,786 | B1 | 5/2003 | Bibelnieks et al. |
| 6,721,714 | B1 | 4/2004 | Baiada et al. |
| 6,757,689 | B2 | 6/2004 | Battas |
| 6,760,632 | B1 | 7/2004 | Heching et al. |
| 6,778,660 | B2 | 8/2004 | Fromm |
| 6,850,901 | B1 | 2/2005 | Hunter et al. |
| 6,895,381 | B1 | 5/2005 | Selby |
| 6,974,079 | B1 | 12/2005 | Strothmann et al. |
| 7,050,987 | B2 | 5/2006 | Lettovsky et al. |
| 7,069,309 | B1 | 6/2006 | Dodrill et al. |
| 7,080,021 | B1 * | 7/2006 | McCulloch ..................... 705/5 |
| 7,249,062 | B2 | 7/2007 | Norins et al. |
| 7,340,403 | B1 | 3/2008 | DeMarcken |
| 7,415,427 | B2 * | 8/2008 | Guo et al. ..................... 705/26 |
| 7,418,409 | B1 * | 8/2008 | Goel ............................. 705/26 |
| 2001/0034686 | A1 | 10/2001 | Eder |
| 2001/0037243 | A1 | 11/2001 | Rouston et al. |
| 2001/0051885 | A1 | 12/2001 | Nardulli et al. |
| 2002/0059283 | A1 | 5/2002 | Shapiro et al. |
| 2002/0065696 | A1 | 5/2002 | Hack et al. |
| 2002/0065699 | A1 | 5/2002 | Talluri |
| 2002/0095328 | A1 | 7/2002 | Swart et al. |
| 2002/0194117 | A1 | 12/2002 | Nabe et al. |
| 2002/0198775 | A1 | 12/2002 | Ryan |
| 2003/0033155 | A1 | 2/2003 | Peerson et al. |
| 2003/0036928 | A1 * | 2/2003 | Kenigsberg et al. ............ 705/5 |
| 2003/0046130 | A1 | 3/2003 | Golightly et al. |
| 2003/0050846 | A1 | 3/2003 | Rodon |
| 2003/0055689 | A1 | 3/2003 | Block et al. |
| 2003/0065581 | A1 | 4/2003 | Takada |
| 2003/0069780 | A1 | 4/2003 | Hailwood et al. |
| 2003/0074239 | A1 | 4/2003 | Hoffman et al. |
| 2003/0074247 | A1 | 4/2003 | Dick et al. |
| 2003/0074249 | A1 | 4/2003 | Hoffman et al. |
| 2003/0074250 | A1 | 4/2003 | Burk |
| 2003/0074262 | A1 | 4/2003 | Hoffman et al. |
| 2003/0074263 | A1 | 4/2003 | Hoffman et al. |
| 2003/0074264 | A1 | 4/2003 | Hoffman |
| 2003/0074281 | A1 | 4/2003 | Hoffman et al. |
| 2003/0074285 | A1 | 4/2003 | Hoffman et al. |
| 2003/0074355 | A1 | 4/2003 | Menniger et al. |
| 2003/0074360 | A1 | 4/2003 | Chen et al. |
| 2003/0078787 | A1 | 4/2003 | Hoffman et al. |
| 2003/0078818 | A1 | 4/2003 | Hoffman et al. |
| 2003/0078827 | A1 | 4/2003 | Hoffman |
| 2003/0078845 | A1 | 4/2003 | Hoffman et al. |
| 2003/0078846 | A1 | 4/2003 | Burk et al. |
| 2003/0078860 | A1 | 4/2003 | Hoffman et al. |
| 2003/0078861 | A1 | 4/2003 | Hoffman et al. |
| 2003/0144867 | A1 | 7/2003 | Campbell et al. |
| 2003/0158771 | A1 | 8/2003 | Shen et al. |
| 2003/0187685 | A1 | 10/2003 | Bakker |
| 2003/0204466 | A1 * | 10/2003 | Guo et al. ..................... 705/37 |
| 2004/0015386 | A1 | 1/2004 | Abe et al. |
| 2004/0039613 | A1 | 2/2004 | Maycotte et al. |
| 2004/0039614 | A1 | 2/2004 | Maycotte et al. |
| 2004/0073496 | A1 | 4/2004 | Cohen |
| 2004/0083113 | A1 | 4/2004 | Cao et al. |
| 2004/0158536 | A1 | 8/2004 | Kowal et al. |
| 2004/0172319 | A1 | 9/2004 | Eder |
| 2004/0230451 | A1 | 11/2004 | Figa |
| 2004/0267580 | A1 | 12/2004 | Becker |
| 2005/0033616 | A1 | 2/2005 | Vavul et al. |
| 2005/0071245 | A1 | 3/2005 | Norins et al. |
| 2005/0097000 | A1 | 5/2005 | Freishtat et al. |
| 2005/0216317 | A1 | 9/2005 | Medellin et al. |
| 2006/0106655 | A1 | 5/2006 | Lettovsky et al. |

FOREIGN PATENT DOCUMENTS

| | | |
|---|---|---|
| WO | WO 0073930 A2 | 12/2000 |
| WO | WO 0073957 A2 | 12/2000 |
| WO | WO 0073958 A2 | 12/2000 |
| WO | WO 01/18722 A1 | 3/2001 |
| WO | WO 0133473 A2 | 5/2001 |
| WO | WO 0157771 A1 | 8/2001 |
| WO | WO 02079901 A2 | 10/2002 |
| WO | WO 03019448 A2 | 3/2003 |
| WO | WO 03/029914 A2 | 4/2003 |
| WO | WO 03/054760 A2 | 7/2003 |
| WO | WO 03102867 A1 | 12/2003 |
| WO | WO 2004/036364 A2 | 4/2004 |

OTHER PUBLICATIONS

Chatwin, "Multiperiod Airline Overbooking With a Single Fare Class," *Operations Research*, 46:6, 805-819p (1998).

Chatwin, "Optimal dynamic pricing of perishable products with stochastic demand and a finite set of prices," *Elsevir Science B. V.—European Journal of Operational Research*; 125, 149-174 (2000).

Compton, "Many Possibilities, One Price," *Customer Relationship Management*,8:8, 16-17 (2004).

Elmaghraby, "Dynamic Pricing in the Presence of Inventory Considerations: Research Overview, Current Practices and Future Directions," *Management Science*, 49:10, 1287-1309 (2003).

Grant, E., "A New Twist in Airline Travel: Surcharges Debut for Certain Ticket Types," *Travel Agent*, 293(11):135(1) Jan. 25, 1999 (recovered from Dialog on Dec. 6, 2008).

Ha et al., "Problem-Focused Incremental Elicitation of Multi-Attribute Utility Models," http://www.cs.uwm.edu/~vu/papers/uai97.pdf, 1-8.

Margulius, "Priced to sell . . . to you," Infoworld San Mataeo, 24:7, 47-48 http://www.infoworld.com/archives/emailPrint.jsp (2002).

Rios-Insua et al., Sensitivity Analysis in an Additive Multi-Attribute Utility Decision Support System, http://www.ciemat.es/convocatorias/eventos/samo2001/esp-riosinsua.pdf, 1-1.

Roth, et al., "Multi-Attribute Utility Analysis" http://msll.mit.edu/maua_paper.pdf, 1-16.

"Booked on the 6.40, the 7.00, the 7.45 . . . " Financial Times (FT) Mar. 8, 1999 p. 15 (recovered from Dialog on Dec. 6, 2008).

www.expedia.com May 19, 2001. Obtained on Sep. 26, 2007 from www.Archive.org.

PCT/IB07/03761, International Search Report and Written Opinion, Feb. 4, 2009.

* cited by examiner

SYSTEM FOR CONCURRENT OPTIMIZATION OF BUSINESS ECONOMICS AND CUSTOMER VALUE SATISFACTION

CROSS-REFERENCE TO RELATED APPLICATION AND PRIORITY CLAIM

This application is a continuation, and claims the benefit under 35 USC 120, of U.S. patent application Ser. No. 10/973,802 filed Oct. 24, 2004 and titled "System For Concurrent Optimization Of Business Economics And Customer Value Satisfaction," and which, in turn, claims the benefit, under 35 USC 119(e) of prior provisional patent application Ser. No. 60/514,248, filed Oct. 24, 2003, titled "Real-Time Optimization Across Integrated Customer Preferences and Company Economics Through Formulation of Value Options That Maximize Value of Both Customer and Company," both of which are hereby incorporated by reference.

FIELD OF INVENTION

This invention relates to a system and method for matching customer preferences with vendor products and services and then dynamically managing the on-demand and optimally customized delivery of business services or products. More particularly, it relates to methods and systems for customizing and optimizing a company's products and services to individual customers in way that concurrently maximizes customer value satisfaction and overall business performance.

BACKGROUND

Historically, "companies" (a term defined below) and their customers often have done business across a gap, so to speak. Product or service offerings by a company the customers' desired product or service do not fully match. In part, this gap is a manifestation of the facts that (1) companies have an incomplete grasp of customer needs, their relative preferences and the pricing utilities customers attach to those preferences (which utilities, equating to the customer's willingness to pay, are dynamic) and (2) a company's costs, profits and inventory (which may control what it can offer on a timely basis) are also dynamic. However, it is also in major part a manifestation of the lack of information technology tools which can close the gap. To collect dynamic customer and company data and then employ those dynamic datum to close the gap is a complex technical problem.

Companies have developed many approaches to increase their internal efficiencies and productivities in order to maximize their gains and profits. With the advent of the computer, companies have, for example, embraced tools to optimize supply chain resources. They have, for example, focused on internal operations and the use of automated processes to integrate the discrete steps from the supplier to the finished goods inventory floor (or service delivery), improving efficiency. Yet still the end customer typically has been treated as an indistinct, static and detached entity—a statistical profile, in the aggregate—sitting behind a wall and creating demand for the rest of the supply chain. Manufacturers (whether of goods or services) have tried to influence the customer demand via indirect means of advertising and promotions. Beyond the influence that these indirect means can have on a customer's purchasing decision, the manufacturer and retailers have for the most part (at least in mass market situations) considered customer demand fluctuations as a given parameter that can't be altered or managed directly. Moreover, in industries where a company typically has an extremely large customer base (e.g., the airline industry, as discussed below), there has been no mechanism which a company could used to tailor its offerings to individual customers, except by providing multiple selections that are fairly static.

Generally, the customer is treated as an individual and sales terms are customized only when the cost of negotiation is justified—for very large transactions. Indeed, the basis for mass marketing a product or service arguably is the "cookie cutter" approach of "one size fits all" transactions. As is said of the genius of Henry Ford in marketing the Model T automobile: the customer could have any color . . . so long as it was black.

With the advent of the global Internet, some providers of goods and services have sought ways to improve their sales and profitability by, for example, directing incentives and rewards to loyal customers enrolled in affinity marketing plans. They have surveyed the customers in efforts to improve product offerings, and they have accordingly modified their offerings. But still, with a take it or leave it approach. "Here are my sale terms and product offerings; buy or don't buy, the choice is yours." Automation has permitted much better targeting of customer groups, but the group still has to be large. For example, a higher end automobile dealer might use a mail campaign tailored to a specific Zip Code instead of a print ad in a regional or national media.

Many products and services, though, represent complex, multi-faceted offerings and customers weigh their preferences for product features differently at different times. A customer might care more about cost one day and more about availability or delivery time or warranty if queried a few days or weeks later, to use some basic trade-offs as examples. Generally, a company's product consists of many value elements, (explained later) all of which are bundled together to be sold as a single product. But, not every customer values all the aspects of a product equally or needs all. Every customer places a different value (which may be a function of time and situation) on each aspect of a product. With features bundled together in a product, companies end up either incurring costs to sell something to a customer that he does want or lose a customer because the extra undesired value elements forced the product price too high for the customer.

The underlying problem is one of a customer whose demands can change quickly and a company whose productive capacity or service does not have the same dynamic time frame and is supported by a relatively fixed (in the short term) capacity and supply chain. Envision an oil tanker trying to keep up with a small power boat through a series of quick turns. It just can't be done. The company's capability is measured through a long cycle that in most cases starts off with a long range plan for space and equipment and a shorter term plan for securing material and hiring production staff. Production plans once set are fixed, and the result is happiness if demand exactly equals supply, excess inventory if too low and unhappy customer if demand is too high or the mix is wrong. Add in other factors such as warehousing, distribution and transportation and the opportunity for failure to meet customer demand is high.

Yet there is no systematic method or system available that allows mass-market sales to be customized around such preferences, let alone while concurrently maximizing the benefit to the company. Envision a situation where the company has a peek at the customers intentions. This knowledge allows the company to be more exacting in its ordering, staffing and delivery. Inefficiencies are reduced, revenue and profitability are increased and the company is then able to reduce cost to the customer while simultaneously improving profits.

A technology platform (i.e., system) and methodology thus are needed for customizing, in an optimal way, match between the availability and pricing of components or qualities of various aspects of a businesses' offerings of its products or services with the individual customer's changeable demand profile. If such a match could be made, both business and customer would benefit. The customer would be more satisfied and the business (long term or short term) will be more profitable. A win-win scenario is created rather than a zero sum game.

SUMMARY

In response to recognition of this need, there is shown herein a system and method that allows businesses to determine their customers' preferences (in advance or in quasi-real-time) and to dynamically integrate these preferences with internal company economics to concurrently maximize value for both customers (i.e., their purchase utilities) and the company (i.e., its profitability).

In general, it is an aspect of the system and method that a business determines a customer's preferences (flexibilities and associated relative utilities) in great detail and in quasi-real-time from direct inquiries and past interaction, before or while engaging in a sales transaction. When a sales transaction is formed, those preferences are then integrated with internal company operations and economics (costs, capacities, constraints, inventories, etc.). Values are then determined for product or service options to be offered to the customer based on integrated (i.e., aggregated) customer preferences and company economics. On one hand, these value options allow companies to reward or charge customers for their flexibilities with respect to preferences. On the other hand, these value options enable companies to maximize their revenues and/or profitability by unbundling their products and services, and best matching the offereings with a customer's expressed preference/cost tradeoffs. Since the customer gets something matching more closely his or her preferences than a "one size fits all" or small, fixed choice approach, customer purchase utility is increased and the customer is pleased to receive a product or service tailored to the customer's preferences. A company may charge for the purchase of some product options. So, customers pay for options made available to them and the company does not have to invest in offering everyone features that only a minority of customers want.

Accordingly, there is shown a system for collecting such customer preference information and pricing corresponding options and presenting options to the customer, receiving customer choices, and completing a sale. The collection steps may be implemented over the global Internet and its World Wide Web. However, other communication media may be used, as well, for all or part of the system or steps. For example, customer information may be taken over the phone or in person or via any other means. And a sale can similarly be completed by telephone or in person.

The system may also provide after-sale follow-up and implement execution of option terms purchased by the customer. An engine may be provided for this purpose. The engine may be a processor(s) that is custom or semi-custom programmed to execute a suitable event response algorithm. For example, if an airline customer at the time of purchasing a ticket were offered an optional feature that in the event of a flight cancellation the customer will be automatically re-booked on the next available flight, and if that option were purchased, then upon the occurrence of a flight cancellation, the system may respond automatically by executing the purchased option term procedure which will re-book the passenger as per the individual's preference. Each procedure for event response (related to a purchased option) may be custom programmed to implement the desired operations of the company or there may be provided a library of procedures generally applicable to an industry. The library procedures may be used by the company with or without customization. The detection of the contingency triggering the procedure may in some instances be made automatic, as by interconnection with the company's information management systems, or it may be externally or manually supplied.

There is also shown a number of novel products generated by the disclosed methodology. Specifically, there are shown airline tickets which are coupled to or include a variety of options including, without limitation, one or more of the following options or option types: event management options (e.g., flight cancellation options, flight delay options, flight overbooking options, flight delay options, flight overbooking options, but back options), accessory options (e.g., alternate date option, modify date options, luggage options, customer sevice options, direct fly options, TCU options), purchase options (e.g., target price options, cyclic buy price options, etc.).

Other features and advantages of the invention will be apparent from the following description and the appended claims.

BRIEF DESCRIPTION OF THE DRAWING

FIG. 18 [label "prior art"] is a screen shot of two web screens showing a conventional reservation of an airline trip;

DETAILED DESCRIPTION

Selected illustrative embodiments according to the invention will now be described in detail, as the inventive concepts are further amplified and explicated. These embodiments are presented by way of example only. In the following description, numerous specific details are set forth in order to provide enough context to convey a thorough understanding of the invention and of these embodiments. It will be apparent, however, to one skilled in the art, that the invention may be practiced without some or all of these specific details. In other instances, well-known features and/or process steps have not been described in detail in order to not unnecessarily obscure the invention. One should not confuse the invention with the examples used to illustrate and explain the invention. The features and advantages of the invention may be better understood with reference to the drawings and discussions that follow.

The method and system taught herein connect customers directly to a manufacturer or service provider and the rest of the supply chain, herein referred to as "channel partners." The term "manufacturer" is intended to include vendors of services as well as vendor of goods. The term "product" is used for both goods and services. Hereafter, the manufacturer and channel partners will be collectively referred to as a "company" or "companies" and all of those terms will be appreciated to include sole proprietorships, partnerships, corporations or any other legal entity or combination thereof. The term "optimize" is not intended to require achievement of a mathematical minimum or maximum, but to refer to enhancement.

General Method Description: Kernel

Figure 1:
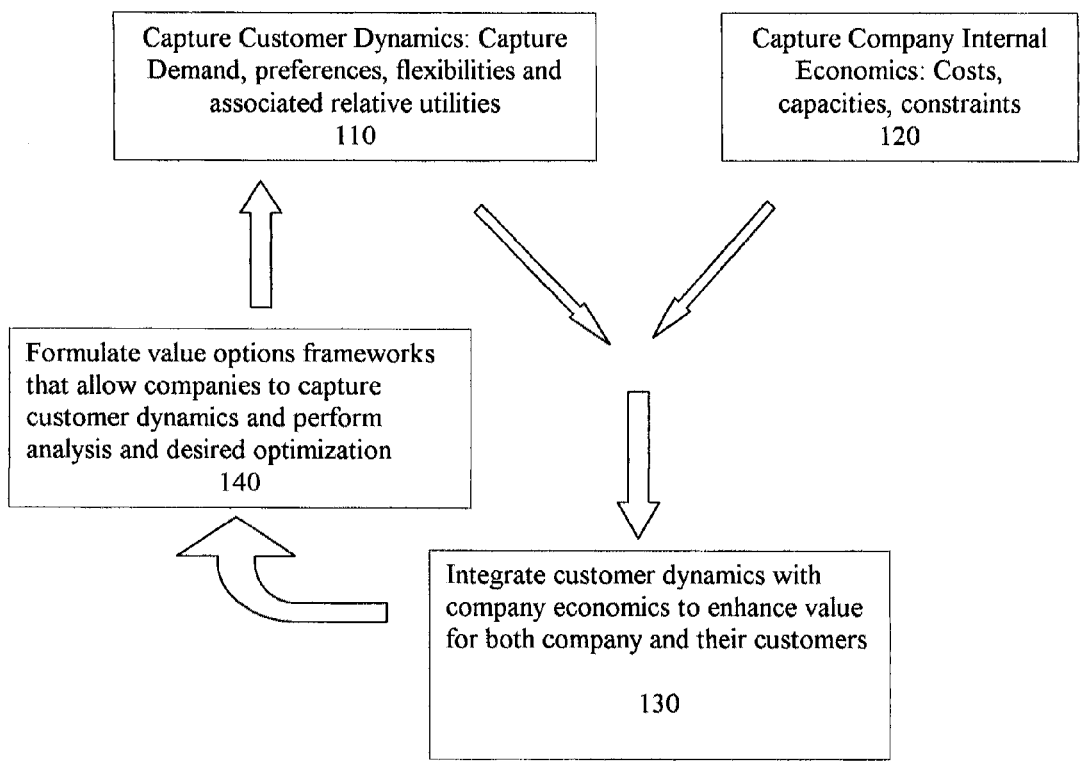
FIG. 1 is a diagrammatic illustration, in a high-level flow chart, of a method of achieving the optionally customized sale of goods or services as taught herein.

Referring now to FIG. 1, there is shown a high-level flowchart style diagram of a method 100 of achieving the optimally customized sale of goods or services to "close the gap." It involves the following steps or acts: In step 110, certain inputs are captured, including customer dynamics and important value segments, their demand, preferences, flexibilities and associated relative utilities. Company economics and important economic factors such as, for example, costs, capacities and constraints are captured in step 120. The customer information from step 110 and the company economics from step 120 are then, in step 130, "integrated" in a way that will permit optimization of value for both the company (i.e., its profitability) and customers (i.e., their individual and collective purchase utilities). In step 140, value options are formulated that permit the capturing of individual customer preferences in way that can be used in the optimization/customized sale process illustrated. These same steps can be used in one or more permutations or combinations or iteratively.

At a high level, the system is operated and the method of FIG. 1 is executed to (1) to dynamically interact with the customers to determine detailed customer demand for the product and options, (2) receive a real-time assessment of company economics, i.e., capacities, constraints, and costs, (3) optimize across demands and preferences of all customers, and company economics, and (4) formulate value options for customers.

To take advantage of this system, a company has to obtain information about customer demand and preferences before a purchase, in a structured manner that can be easily understood and translated into satisfaction for customers and also can be used to optimize internal operations for companies. This data can then be integrated with the company's internal resources and capacities to enhance and improve its operations. A company can both better serve its customers and enhance its internal gains (for example, obtaining some or all of higher revenues, lower costs, higher capacity utilization, and improved service levels). A company can "optimally customize" its products and processes to enhance the value for customers, while simultaneously maximizing its business profitability. Customers also benefit from the fact that they spend less time researching products, can be assured that their priorities are known in case of change or contingency events occurring, can enhance their purchased products/services and get more perceived value for their purchase price. A company may develop reward/insurance incentive programs with its customers that permit optimization of company operations, using one or more reward or payment programs in a way that increases the company's internal profitability as well as satisfies customer preferences.

Figure 2:
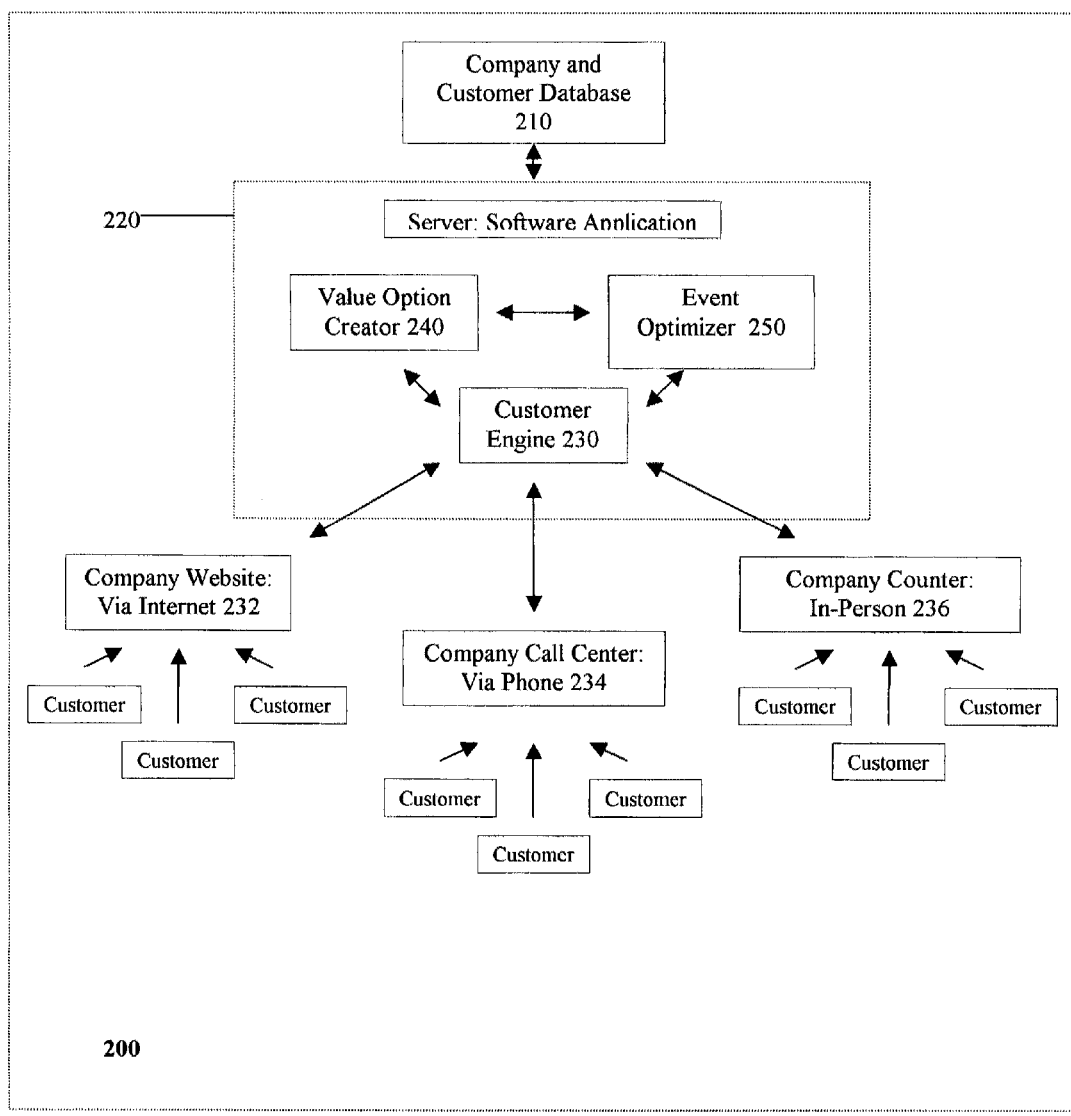
FIG. 2 is a block diagram of a system as taught herein for practicing the discussed method.

At a high level, a block diagram of a typical system 200 for implementing this methodology is shown in FIG. 2. The data for driving the system, from both the customer side and the company side, is stored in a database 210 (or multiple databases), which may be of any suitable database design and may be a commercially available database product configured for this application. The "heart" of the system is a platform, typically a server(s), 220, which provides the processing capability to implement three modules, 230, 240 and 250. The Customer Engine module 230 controls the interfacing with the customer via whatever media are selected by the company. For example, the company may use one or more of a web site 232, a call center 234 and/or live customer service "counter" personnel 236 (e.g., at a point-of-sale location). The Value Option Creator module 240 is a software program(s) that performs the functions of allowing a company to design, create and configure different value option frameworks and corresponding value options that can be offered to customer to capture their needs and preferences in detail and in a way that can be used to optimize across company operations. The Event Optimizer module 250 comprises a program or programs that (a) monitor company business performance and provide information about capacities that are available and underutilized, as well as other relevant factors that may vary from installation to installation; and (b) monitor for the occurrence of events related to the value options which customers have bought, and which then execute pre-designed protocols when a related event occurs (e.g., a re-booking algorithm is activated when a flight cancellation event occurs).

Example A

Furniture Industry

Figure 3A:
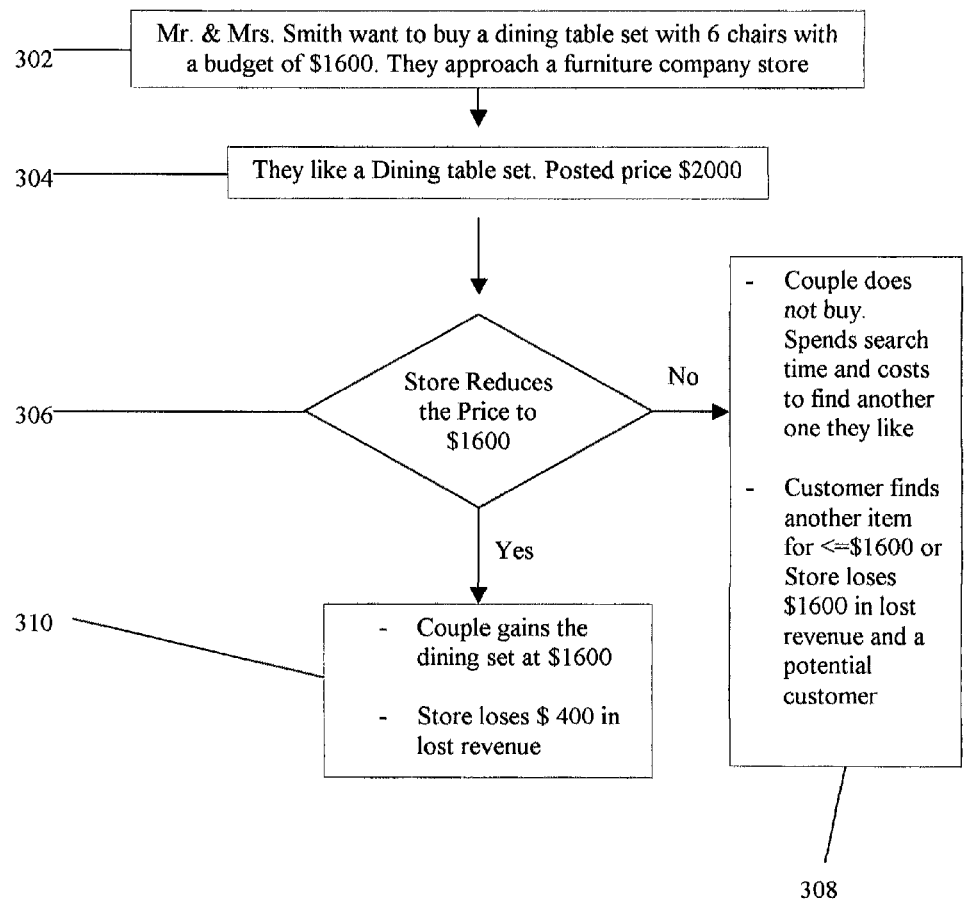
FIG. 3A is a flow chart of a prior art furniture sale transaction.
Figure 3B:
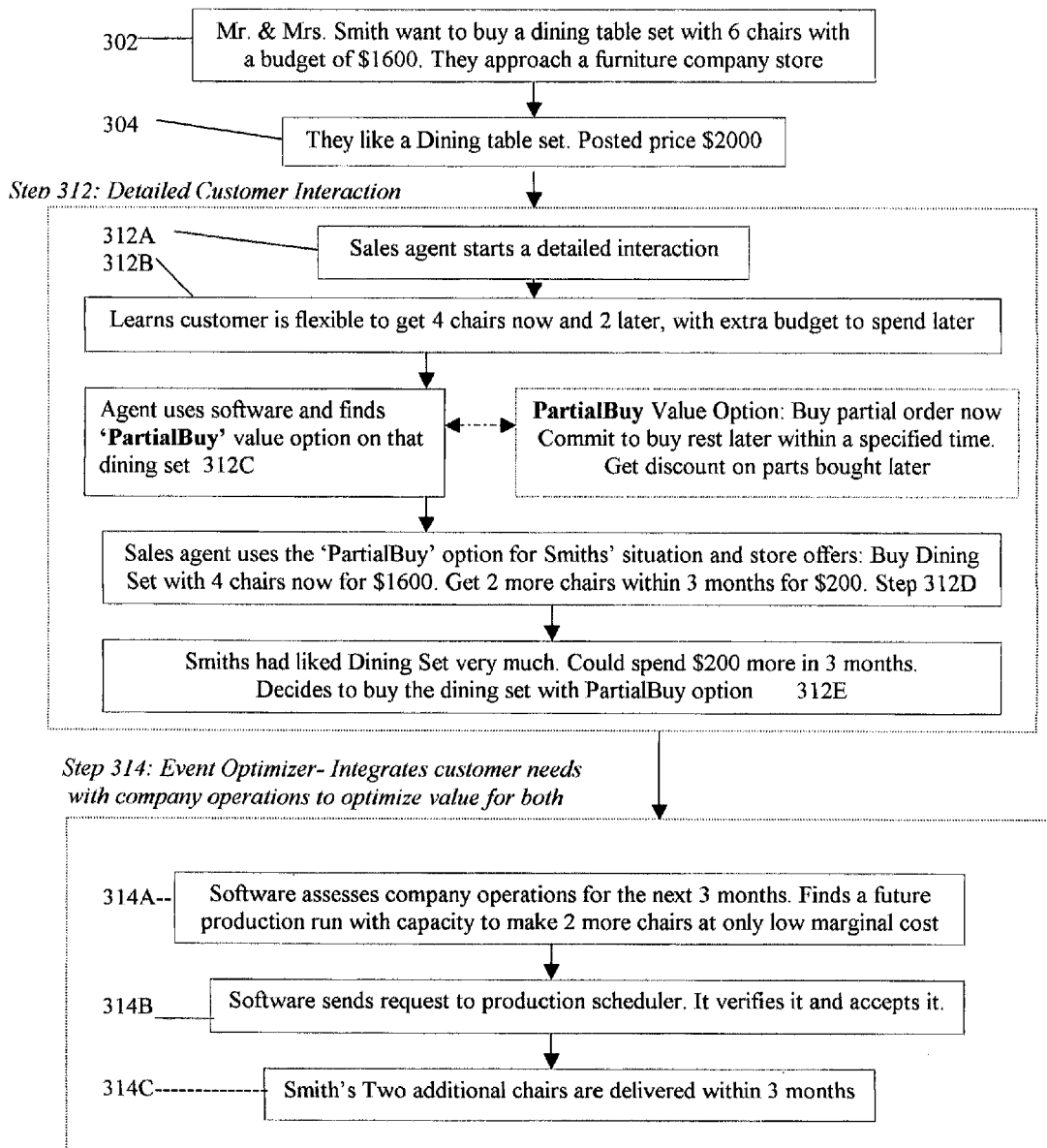
FIG. 3B is a flow chart of an alternative way of providing for more beneficial transaction that is shown in FIG. 3A, for the same parties.

As a first example which may be helpful, consider the typical prior art situation of FIG. 3A and its counterpart under the new regime taught herein and shown in FIG. 3B.

Turning to FIG. 3A, we posit that Mr. & Mrs. Smith were shopping for a dining table set with six chairs. The couple had a budget of only $1600. They walked into a furniture company store. Step 302. They liked a particular dining set which carried an asking price of $2000. Step 304. In the current world, either one of the two things could happen: (a) the Smiths don't buy this dining set and search for another one, possibly at a competitor store, leading to loss in revenue for this store, Step 308, or (b) the store owner could reduce the price (if possible) to offer the dining set at $1600 and make the sale to Mr. & Mrs. Smith, Step 310. This latter alternative would provide satisfaction to Mr. & Mrs. Smith but would make the store owner lose $400 in planned revenue.

Now, let us understand, in connection with FIG. 3B, how the furniture company could have used the inventive system and method to improve its profitability while concurrently maximizing the satisfaction for the customer (Mr. & Mrs. Smith).

Step 312 Detailed Customer Interaction: Using system 200 or the like, the company undertakes a detailed interaction with the Smiths. Let us assume that this is done via a direct salesperson-customer conversation, just to have a context. As shown in FIG. 3B, this activity involves a number of sub-steps (which shall nonetheless be called steps). In step 312A, the store sales agent (salesperson) starts a detailed interaction with the couple. During the interaction, the agent asks questions to learn that the Smiths could be flexible; that they are willing to get only 4 chairs now and to buy two more later, within a reasonable period of time. Step 312B. He also learned they would have an extra budget to spend later. The sales agent uses a software tool to scan the sales options that have been established by the company, stored in the database 210, based on Smiths' needs, and picks the PartialBuy option on the dining set. Step 312C. In the PartialBuy option, if a customer buys a partial order and commits to buying the rest of the order within a specified time period, the customer gets a discount. Upon selection of the PartialBuy option on the dining set that the Smiths liked, the Customer Engine provides to the Smiths an offer to sell them the dining set with 4 chairs at $1600, if they commit to buying two more chairs for $200 within three months. Step 312D. This offer may be created in various ways. It may be based on choices the store management previously made and stored in the system, for example, but preferably it is generated in quasi-real time from current company data, as in the example discussed below. The Smiths had liked the dining set a lot and definitely wanted to buy it. Further, they could afford to spend an extra $200 in another three months for the two additional chairs. Hence, they decided to accept the company's offer with the Partial-Buy option. Step 312E. The sales agent executes the transaction successfully.

Step 314: Event Optimizer—

The Event Optimizer, it will be recalled, integrates customer information with company operations to enhance value for both. The operation of the Event Optimizer is exemplified in step 314, which comprises three sub-steps. In this example, the Event Optimizer is designed to assess company operations over a three-month period, but that interval is arbitrary. In this example, the event optimizer software assesses the company operations for the next three months. Step 314A. In so doing, the software determines there is a future scheduled production run with additional capacity to make two more chairs at low marginal costs. The Event Optimizer module sends a request for two more chairs to the production scheduler (Step 314B), which verifies it and confirms it.

An added advantage could be that the company may be able to consolidate more orders for the particular chairs within the next 3 months, to generate further economies of scale.

The furniture company built two more chairs in the scheduled run and delivered those to Smiths. Step 314C.

Using the above system and method, the Smiths were able to purchase the product they wanted within their budget and time flexibilities, and it maximized their overall purchase utility. Although they paid $200 more than planned, they obtained the product they wanted and saved the extra search time and costs to look elsewhere. The returns to the furniture company included the generation of higher revenue ($1800 as opposed to $0 in one case and $1600 in another case) than otherwise was possible. Secondly, the company also saved certain costs including inventory, storage, overhead, sales and marketing costs on the additional two chairs, which consequently increased the company's profit margin. The company increased their capacity utilization by building two additional chairs. The company also benefited from the fact that they were able to become an important part of the Smiths overall buying experience and by positively affecting their buying decision. Note that the purchase of the dining set is really a subset of the Smith's decorating their house. Instead of working on one purchase decision at a time, the company's overall intent is to tap into the whole decorating scheme and sell the full range of products, not just tables and chairs. A typical dining room has much more furniture. By working with the customer on the entire purchasing decision, the company benefits in the short run by planning better with a known demand and in the long run by selling an entire room instead of a few components. In a later example, we focus on a trip package not a single plane trip. Finally, the furniture company benefited from adding another satisfied customer to their customer base, which could lead to higher repeat business in the future and provides free word-of-mouth marketing. Thus, both the furniture company and the customer benefited at the same time.

Example B

The Airline Industry

Let us consider another example, this time from the airline industry, of how a customer and a company can both benefit at the same time, by closing the gap between them. The traditional approach of FIG. 4A will be contrasted with the new teaching of FIG. 4B.

Figure 4A:
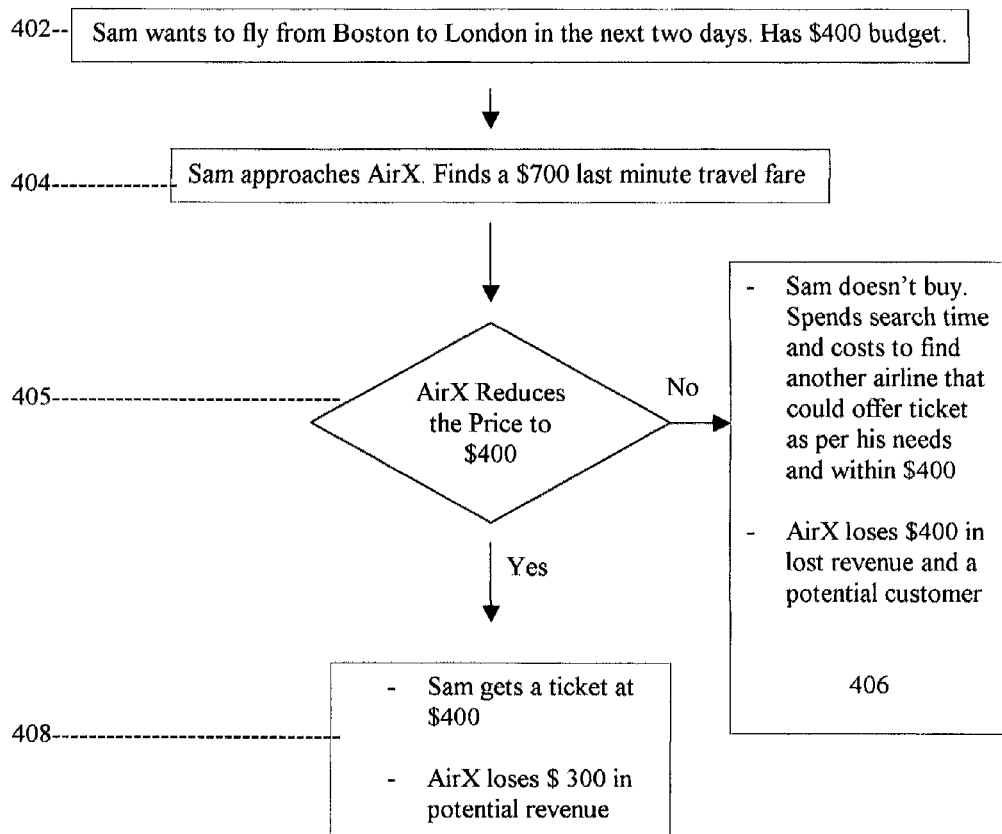
FIG. 4A is a flow chart of a prior art airline ticket sale transaction.
Figure 4B:
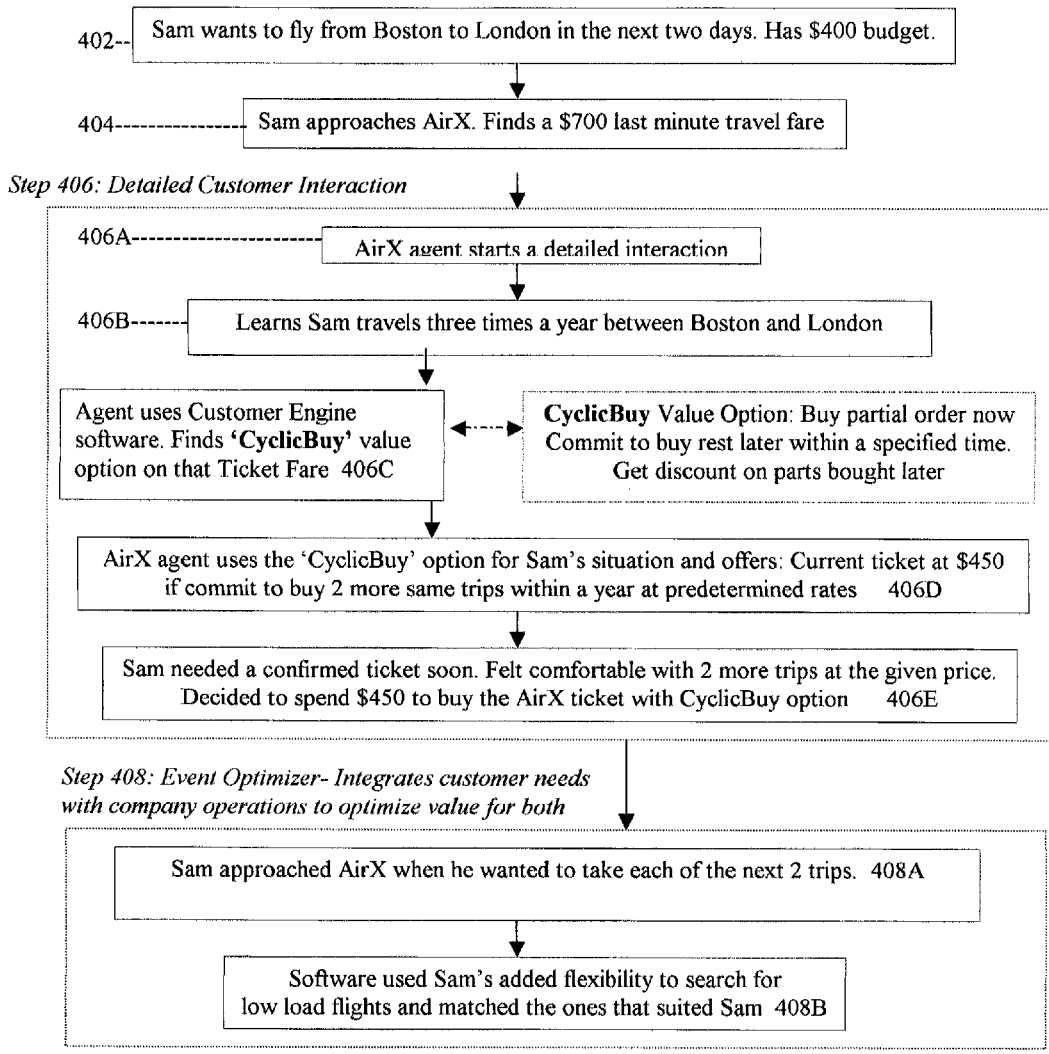
FIG. 4B is, by contrast, a flow chart of one alternative way of providing for the sale of an airline ticket using a CyclicBuy option as target herein.

As shown in FIG. 4A, in block 402, Sam wants to travel from Boston to London within the next two days and has a $400 budget. Sam approaches an airline, e.g., AirX, for an airline ticket from Boston to London. Step 404. Within the current business conditions, i.e., last minute travel, Sam is likely to find very high prices for tickets, say $700. If Sam had booked the ticket at a 14- or 21-day advanced purchase, he might have gotten a ticket at a much lower price, say $400. In this situation, the company (AirX) and Sam are playing a zero-sum game. Either Sam could leave AirX and approach another competitor, who might offer him a cheaper rate (steps 405, 406), or AirX could potentially lose profit (if someone else were willing to buy the $700 ticket) by offering Sam a discount to gain Sam's business (steps 405, 408).

The method taught above can change the outcome of this situation. Using, for example, the computer network arrangement similar to FIG. 2, via a software application 230 running on a web server 220, a detailed interaction with Sam is begun. This is a structured interaction. Step 406A. From this interaction, the Customer Engine 230 administers a questionnaire or survey which is designed to elicit information useful in constructing options to offer Sam. The possible options are stored in database 210. From this survey, AirX learns about Sam's demand in great detail (step 406B) before quoting Sam a price for the airline ticket. For example, AirX learns that Sam travels about three times between Boston and London each year.

The Customer Engine 230, in response to the agent query (this may be a human agent or a software agent) analyzes the value option frameworks available from the Value Option Creator 240 and picks the CyclicBuy value option that suits Sam's situation. Step 406C. In the CyclicBuy option, a customer can get a better fare if he commits to buying multiple trips between the same cities within a specified interval. The Customer Engine runs the CyclicBuy value option on the ticket that Sam wants and finds one or more value options for Sam. For example, AirX offers Sam a flight for $450 if he commits to flying AirX on two more similar trips within that year, at predetermined rates. Step 406D. Let's assume Sam wanted to get a confirmed ticket soon, and he felt comfortable about making two more trips within the next year at given rates. He decides to buy the AirX ticket at $450 along with the CyclicBuy option. Step 406E.

So, what happens when Sam is ready to make the two additional trips? This is where the Event Optimizer module comes in. The Event Optimizer engine figures out how best to meet Sam's need and satisfy the company's contractual obligation to Sam, while doing so in the way most advantageous to the company. That is, there usually will be multiple ways to meet Sam's need but some are more profitable than others. The module decides which to deliver.

Sam begins by approaching AirX for a ticket. Step 408A. Since Sam is free of the burden of searching for air fares, he saves time and aggravation. The Event Optimizer module uses Sam's needs and flexibilities and integrates the same with AirX's schedule, availability, costs, load factors and other relevant considerations, to determine low load factor flights that also satisfy Sam's needs and meet the company's commitments to Sam. Step 408B. The choices are presented amd Sam picks one or the system makes the selection and informs Sam of the arrangements:

In this way, the situation turns from a zero-sum to a non-zero sum game. Sam gains purchase utility value: he gets to his destination with his requirements met (design, price, delivery, and service) and with reduced effort and aggravation. AirX makes more revenue and profits, i.e., AirX fills three seats profitably while Sam travels three times at a competitive and acceptable cost. AirX was able to increase its capacity utilization and also balance its load to fill flights with low load factors.

Process to Use the New System and Method in an Industry

With those examples as background, it would be useful now to describe in detail how this system and method may be used in any particular industry. (Industries and companies best suited to use and benefit from the invention are those with large numbers of customers and wherein those customers would have varied utilities for aspects of a product offering, if those aspects were unbundled and some made optional.)

To get maximum benefit from the herein disclosed system and method requires the use of human judgment. It should be emphasized, therefore, that there is shown a "platform" technology and a variety of non-exhaustive ways of using the platform. Those who make use of this platform in their companies will make decisions and exercise their judgment so that each instantiation or practice is likely to be unique, at least to a degree. In addition to disclosing the platform, via the given examples we also disclose certain instantiations of the system and method which themselves are believed to have value but the system and method are not intended to be limited to these instantiations except as they may be expressly claimed.

Using the discussed system and method in any industry involves a two-staged approach. The selection of an industry is assumed. The industry provides a context. Starting in FIG. 5, in the first stage of the method, a set of value options frameworks (to be associated with a company's offerings) is created. It is immaterial, for the current discussion, how one obtains the information used to construct a value options framework. Implicitly or explicitly, a value options framework reflects some sort of analysis of customer dynamics and company economics. In simplest form, a value options framework is a listing of optional components of a product offering and associated charges. Thus, to construct a value options framework for a particular type of transaction, one needs to arrive (however one chooses) at a list of components the customer may select when buying a product, and their prices. For example, in a simple case there may be delivery options and warranty options and maybe training options. In another example, a car dealer might offer equipment and color options. Each option is assigned a price, whether statically, quasi-statically, or dynamically. Static pricing is assigned at very infrequent intervals. Dynamic pricing (determined by an algorithm invoked by the Event Optimizer) is assigned either on an on-demand basis for a particular transaction or at frequent intervals so as to yield pricing based on near (i.e., quasi) real time company performance data Quasi-static pricing would be somewhere between the former two situations, such as pricing done quarterly or monthly based on then-current information about the company. Pricing may involve running financial analyses based on known data to optimally set the conditions and pricing in the value options framework associated with the company offerings.

Figure 17:
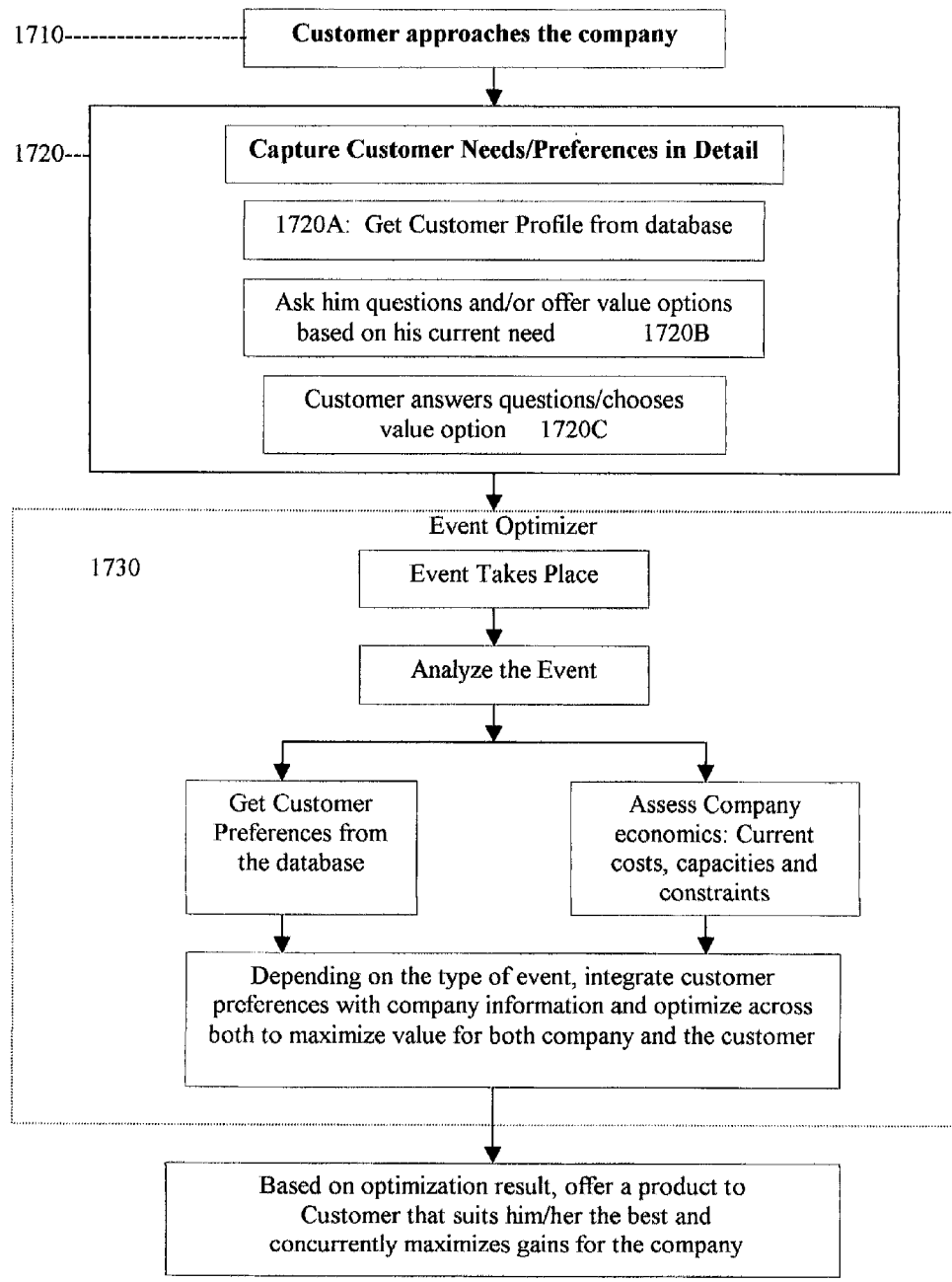
FIG. 17 is a flow chart of a process to use a volume options framework.

The second stage, as depicted in FIG. 17, involves a detailed interaction with the customer who has approached the company (step 1710). Approaching the company may involve accessing a web site or calling a call center or any other way of commencing a transaction. The interaction (step 1720) occurs in a structured format to capture the customer's expressed needs, preferences, flexibilities and relative utilities. As a preliminary matter, it is possible the customer may previously have registered a profile containing default selections of needs, preferences, etc. So, the database 210 is interrogated to determine whether a profile exists and, if so, to retrieve it (step 1720A). The customer is presented with questions and/or value options (step 1720B) and in response he/she supplies answers and select options that suit him/her (step 1720).

The second step in the second stage is executed by the Event Optimizer module 250. The Event Optimizer is alerted to, or detects, the occurrence of an event for which an event-response procedure (program) has been pre-stored. Each event-response procedure is designed by the company to effect selected action(s) in response to detection of its corresponding event. Depending on the nature of the event, an event-response procedure may invoke an optimization algorithm, assess the company operations (possibly in real time) and analyze, across company operations and customer information, potential results to determine results that concurrently maximize the benefits for the company and the customer. The optimization may or may not modify the company product offerings to better suit the customer while simultaneously maximizing the company operations. Both of the stages and the steps involved will now be discussed in detail.

First Stage: Formulation of Value Option Framework

Figure 5:
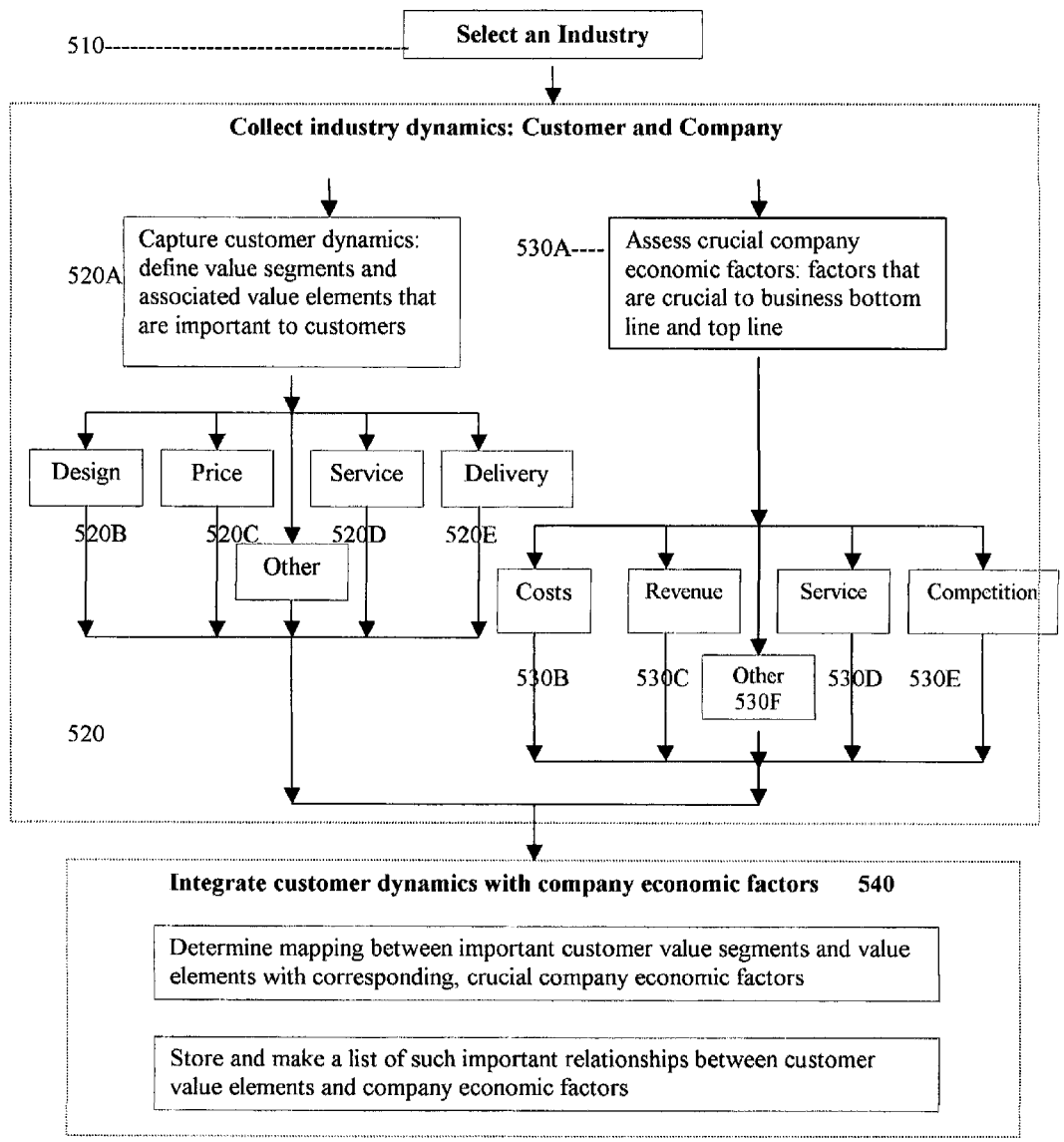
FIG. 5 is a flow chart of a method to create a value options framework showing collection of industry and customer dynamics.

Turning to FIG. 5, it will be assumed that the inventive method and system are to be adapted to a particular industry or company. One may develop a generic instance for an industry or particularize it to an individual company. Some considerations will inherently be generic to an industry. Thus, to formulate a value options framework, one begins by selecting the industry. Step 510. Next, the customer and company dynamics are captured. Steps 520 and 530. To capture customer dynamics, one needs to understand the value segments and value elements that are important for the customer. To assess company dynamics, one needs to assess the economic factors that are crucial to the company's profitability and performance. The details are explained below along with a step-by-step detailed example from the airline industry.

Capturing Customer Dynamics—Step 520A

Figure 6A:
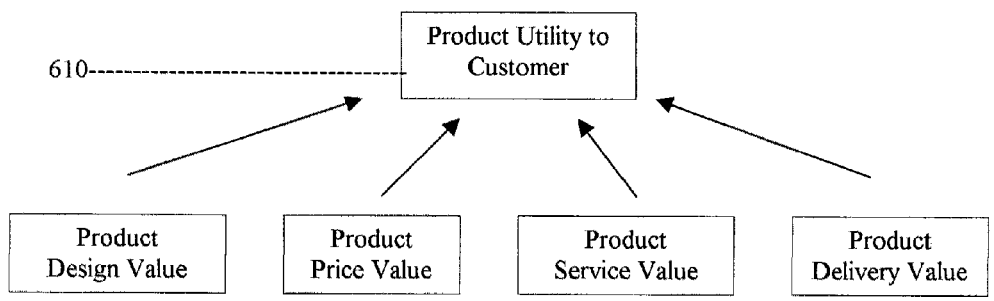
FIGS. 6A and 6B are diagrammatic illustrations of the relationship between overall product utility and contributions thereto as perceived by a customer.
Figure 6B:
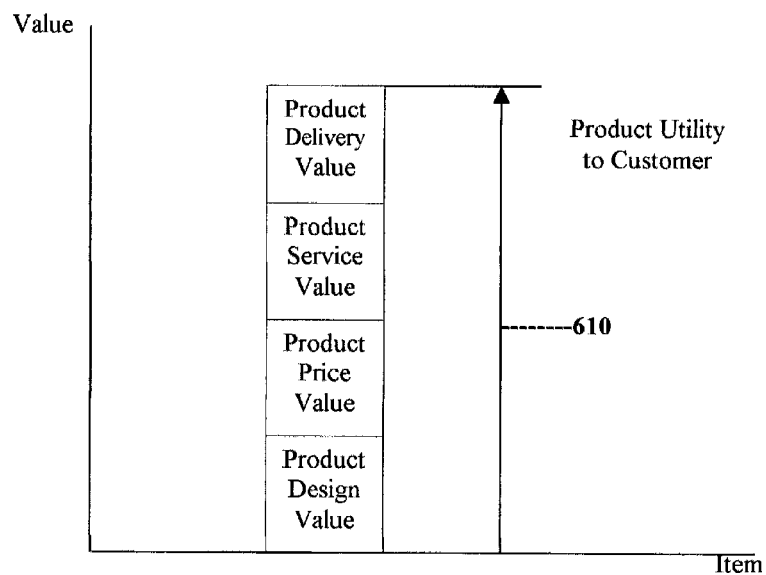

A customer derives certain utility by purchasing a particular product. The purchase utility value, typically, can be separated into many value segments. Individual customers value these segments (which include core qualities of the offering as well as options and contingent options i.e., options dependent on options) from the perspective of what is important to the customer through the whole buying and usage experience, starting from, searching for a product, placing a particular order and using the product throughout its lifecycle. To go further, it will be helpful to define two terms: value segment and value element. A "value element" is a distinct aspect/characteristic of a product's buying and usage experience that may affect the utility of the product to the customer. A "value segment" is a particular category of such value elements. While value segments may vary from industry to industry and will have to be selected by the individual or team that implements a particular instance of this system and method, for many industries, the four most important value segments are (a) product design value, (b) product delivery value, (c) product price value, and (d) service value. See boxes 520B-E. These value elements are shown in FIGS. 6A and 6B, which are simply alternative views of the same information and will be discussed below. It should be noted, however, that these value segments are just provided for illustration purposes. Industries that can benefit from the system and method of the invention may have more or fewer than the listed value segments and/or a different list of value segments. Each value segment may have one or more value elements. Further, the actual number of value elements in each value segment may vary with the industry, the level of detail in the business model, and even the customers. The system implementer can choose the number of value elements in each value segment.

Total Value for Customers:

A customer derives unique value from each value segment; the total utility value of the product to a customer (as shown in FIGS. 6A and 6B) is the combination of values derived from each of the value segments. A customer would benefit the most if the total expected value of his/her utility were maximized. Another important aspect to note is that every customer also has an acceptable range (e.g., equals, exceeds, or disappoints, minimum or maximum) for each individual parameter value. Even if a particular product has high overall value, a customer may not desire the product if it scores below the minimum level (i.e., low enough to reject the product) for any one or more of the value segments or value element. Mathematically, the concept may be expressed as:

$$TU(Cj, Pk) = \sum_{i=1}^{n} Ui(Cj, Pk)$$

where,

TU (Cj, Pk)=Total Utility for Customer (Cj) from, buying and using a product (Pk)

Ui (Cj, Pk)=Utility derived from value element (i) of Product (Pk) for Customer (Cj)

n=Number of value elements

For the four value segments defined above, the above formula can be transformed into:

$$TU(Cj,Pk)=Uds(Cj,Pk)+Udl(Cj,Pk)+Us(Cj,Pk)+Up(Cj,Pk)$$

Where:

TU (Cj, Pk)=Total Utility for Customer (Ci) from product (Pi)

Uds (Cj, Pk)=Design Utility value of Product Pi to customer Ci

Udl (Cj, Pk)=Delivery Utility value of Product Pi to customer Ci

Us (Cj, Pk)=Service Utility value of Product Pi to customer Ci

Up (Cj, Pk)=Price Utility value of Product Pi to customer Ci

Each of the utility functions depends on the particular product and the customer in concern.

Much work has been done on utility analysis and multi-attribute utility analysis and how to build such utility functions, in the academic and corporate world. Using a utility analysis model is not a requirement for a user to effectively use the system and method taught above. It may help to further increase the benefit derived from using the system but it is not necessary. It is, however, important to understand the concept of utility to be able to better use the system and method taught herein.

Figure 7:
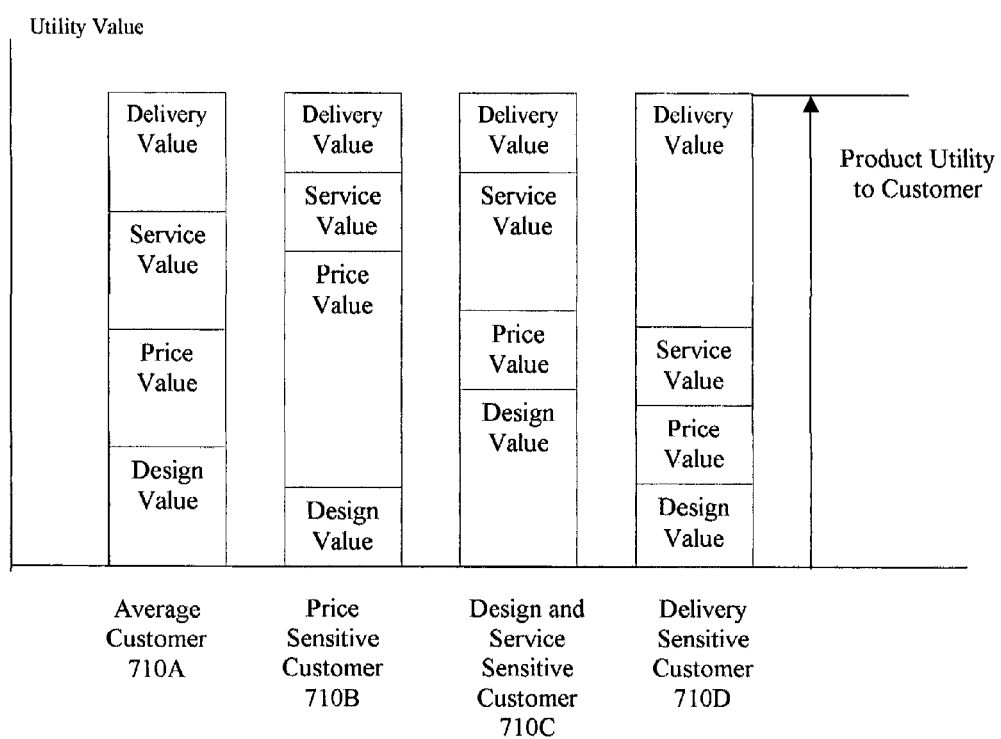
FIG. 7 is a diagrammatic illustration of the perceived utilities of a product by four customers.

Concept of Tiered Value Perception:

Different customers may derive different utility from different aspects of the same product. As shown in FIG. 7, four different customers 710A-710D may compute to the same (total) overall utility even though they assign different utility values to each of the value segments. For example, a human resource manager, who has scheduled interviews with candidates, would value the timely ticket to his destination much more than a vacationer, who may be flexible. Consequently, the company needs, in some way, to define and learn about these value parameters for individual customers, along with relative preferences and utilities associated with each parameter. This will be illustrated below using the previously listed value segments. A web-based questionnaire is one excellent way to collect this information. The collected information is then stored in a customer profile or itinerary in a database, such as database 210.

(a) Product Design Value:

The "product design" segment refers to the value elements relating to the design features and characteristics of a product that the customer actually buys. The airline industry will be used as an example or case study. For example, in the airline industry, product design for an airline ticket would include value elements such as total flight duration, number of intermediate connections, departure and arrival time, and route.

Each customer places his or her own values on these different design value elements. For example, one customer, a vacationer, may value the particular departure date more and may not be too concerned about the departure time. Another customer, a businessperson, may value arrival time more than departure time, in order to get to a meeting. The company thus collects information on the product design needs of the customers.

(b) Product Delivery Value:

The "product delivery" segment refers to the value elements relating delivery or time-frame related aspects like, for example, lead-time and delivery schedule from the time the customer places an order. In the airline industry, for example, one value element for an airline ticket could be lead-time between placing an airline ticket order on a website or with a travel agent and getting ticket confirmation or ticket in hand, e.g., e-ticket or paper ticket. Another delivery value element could be the amount of time between the order confirmation and actual departure date (or, in other words, how long before the actual departure date the customer needs to order the ticket—e.g., 7 days, 14 days or more than 21 days) to get the desired value. Again, each customer may place his or her own values on each of these value elements. The company collects detailed information on the product delivery needs of the customers.

(c) Product Price Value:

The "product price" segment refers to the groups of value elements related to the price a customer pays to buy/use a product. Value elements in this segment may include total product price, delivery costs, warranty or after-sales service costs, and any other relevant costs incurred by the customer in buying and using the product. Some times, addition of all these price elements is also termed the total cost of ownership (TCO). A customer derives maximum price value by paying the most desired price for a product. Any price paid either lower or higher than the desired price may change the value the customer gets from the price of the product. In the airline industry, for an airline ticket, the product price would include the cost of the ticket, taxes, any fees, delivery charges, cancellation or change costs as incurred by the passenger. The company collects information on the product price needs of the customers.

(d) Service Value:

The "service value" segment refers to a group of value elements related to the service a customer receives from pre-sales and post-sales services offered by the company to facilitate the use of the products sold. Pre-sales services include services provided by a company to help its customers decide and choose products based on their requirements. Post-sales or after-sales service refers to the warranty, product support, maintenance support and other relevant activities that may help a customer to use the product effectively. For example in the airline industry, pre-sales services include providing access to detailed flight information, as well as various methods of payment and of booking tickets. The post-sales services in the airline industry would include services like check-in, flight status reporting, management of flight cancellation or flight delays, customer service and administration of frequent flyer programs. Individual customers have different requirements for both pre-sales and post-sales services and thus place different values on such services. A customer will derive maximum service value from a product if the services provided by the company completely match or exceed those desired by the customer. The company utilizing the invention collects information not only on the service needs of its customers, but also on customer preferences on different possible events that might occur during or after the purchase. For example, in the airline industry, such information could include customer preference in case of flight cancellation or delay. For example, the customer could be asked to indicate whether the customer is insistent on taking the next available flight or if the customer is flexible and able and willing to wait longer (each decision may be a function of cost, or other factors).

Summary of Capturing Customer Dynamics:

Based on the method described above, the first step for a company-user is to establish the value segments and value elements it will present to the customer for the customer's decision. It may establish these value segments and value elements in any way it chooses, but a preferable way is to analyze the value segments and value elements that are important to customers by doing market research. Such market research may, for example, include conducting focus groups with customers, via questionnaires, or using other techniques familiar to marketing professionals. An industry expert may choose to avoid such research and, instead to rely on experience.

Figure 8:
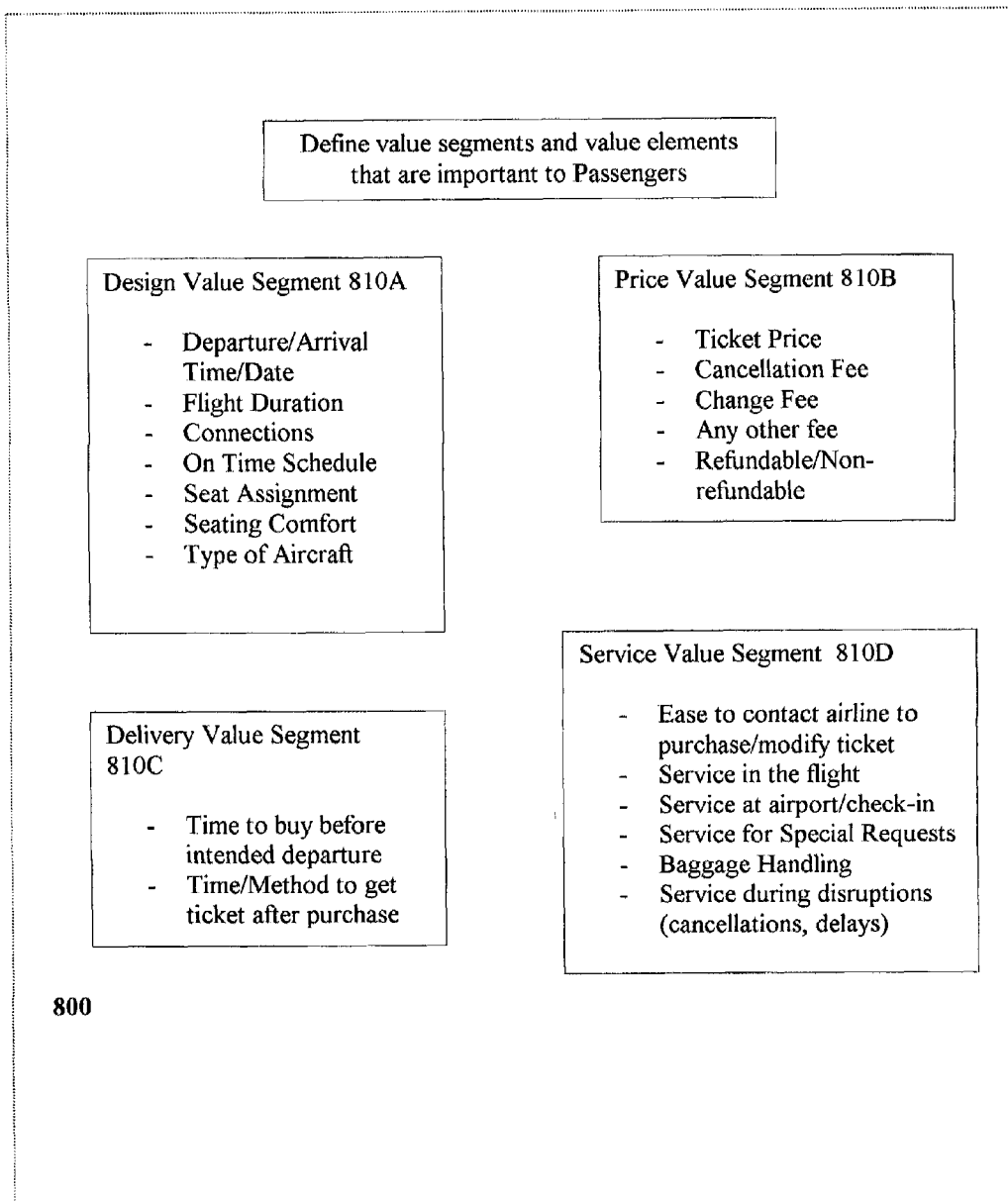
FIG. 8 is a diagrammatic illustration of an exemplary set of value segments and their value elements in the airline industry.

FIG. 8 provides an example of how this method could be used in the airline industry to capture relevant passenger dynamics, step 800. An analysis is shown for various illustrative value segments 810A-810D that matter to customers in the airline industry. It has been determined that in the design value segment 810A, important value elements include but are not limited to departure/arrival time and date, flight duration, connections, on-time schedule, seat assignment, seating comfort and type of aircraft. In the price value segment 810B, it has been determined that value elements may include but are not limited to ticket price, cancellation or change fee, refundable or non-refundable ticket and any other fees. It has been determined that in the delivery value segment 810C, value elements may include but are not limited to the time a ticket must be bought prior departure and the time and methods for getting the ticket. Similarly, it has been determined that the value elements in the service value segment 810D may include but are not limited to the ease of contacting the airline to purchase or modify a ticket, service during the flight, service at airport/check-in, service for special requests, baggage handling, and service during disruptions (e.g., flight cancellation, long delays, overbooking, diversions).

(2) Assessment of Company Economics:

The next step in the first stage, as shown in FIG. 5, is to assess the crucial economic factors that affect the bottom-line and top-line of the company, step 530A. For example, these factors may include but are not limited to revenues, fixed costs, inventory, available and scheduled capacity, constraints on product availability and total and marginal values for current direct and indirect product (and/or services) costs. For illustration purposes only, FIG. 5 shows the grouping of such factors into five major categories 530B-F, including costs, revenue, service, competition and other.

Figure 9:
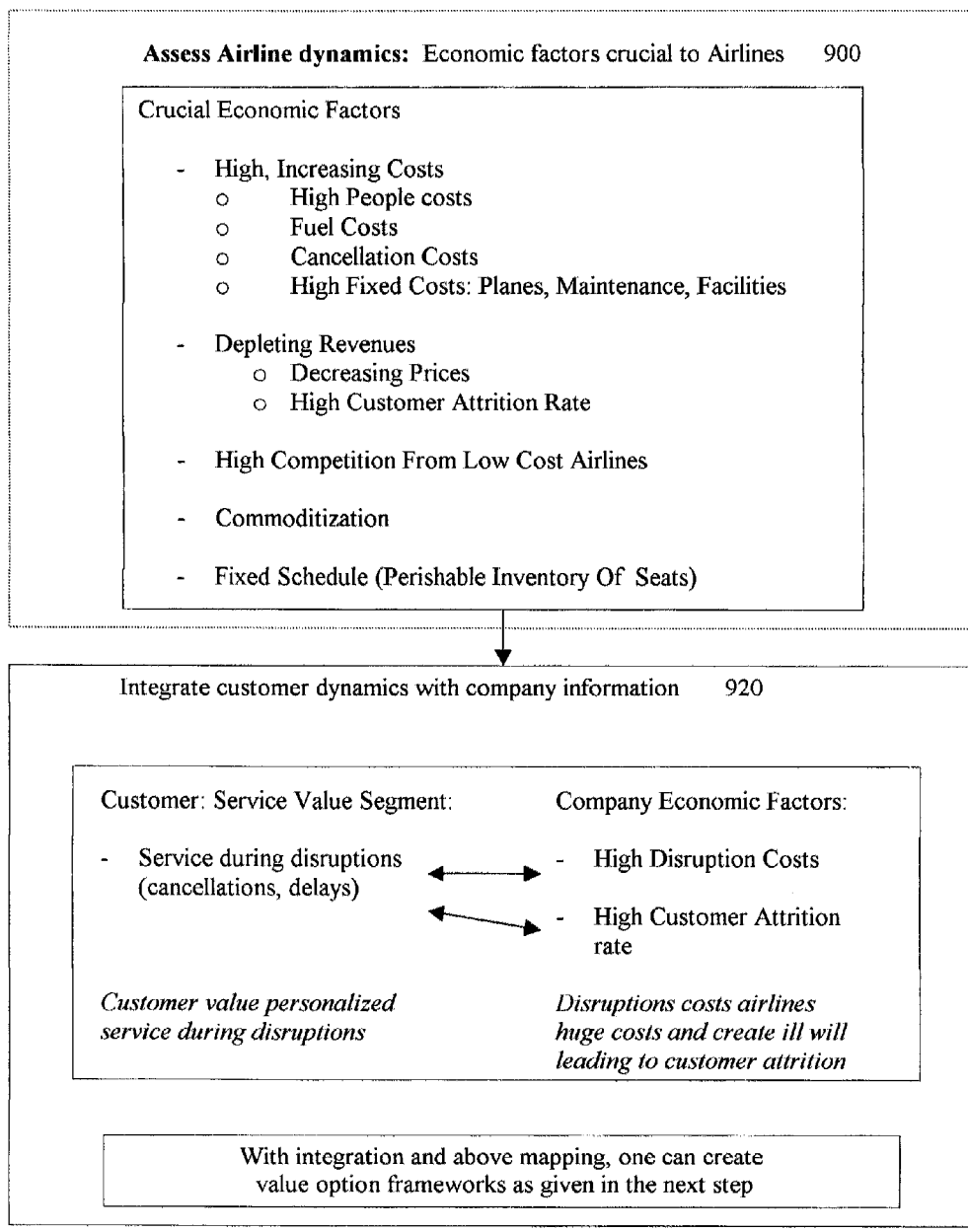
FIG. 9 is a diagrammatic illustration of collecting airline dynamics and integrating the same with customer dynamics.

Continuing with the airline industry example, an assessment 900 of the crucial economic factors, as indicated in FIG. 9, may reveal these factors to include (but not be limited to) high and increasing costs consisting of high human resources costs, high fuel costs, disruption costs, high fixed costs (planes, facilities and maintenance), depleting revenues due to decreasing ticket prices, increased competition from low cost carriers, high customer attrition rate, and commoditization of the airline industry. One may dig deeper into details like load factors, seats booked, available seats on different flights, costs per passenger mile, marginal costs per passenger mile, costs of alternate carriers and so forth. It might be beneficial if a company utilizing the inventive system and method were able to express cost elements in a real-time or quasi-real-time (i.e., up to date) dynamic fashion so that such information can then be used to assess the profitability or contribution of each product sale opportunity, and to facilitate the operation of the Event Optimizer (so that offers and actions can be based on real-time or near-real-time information). Certainly that is not always required and would not be required in an industry where there is little change in cost elements over a significant time interval.

(3) Integration of Customer dynamics with company economic factors:

A third step, shown in the box 540 of FIG. 5 and box 920 in FIG. 9, is to take the information collected from the previous two steps, analyze this data and find important value segments and elements that directly affect the crucial economic factors for the company. This operation involves creating a mapping between company factors and customer value segments, to establish direct and indirect relationships between the two.

FIG. 9, in step 920, illustrates an example of this mapping in the airline industry. It is determined, for example, that customers value personalized service during a disruption (flight cancellations, delays, diversion, overbooking). Yet disruptions create huge costs for airlines and generate leading to loss of goodwill and high passenger attrition rate. Some other examples are mentioned later.

Figure 11:
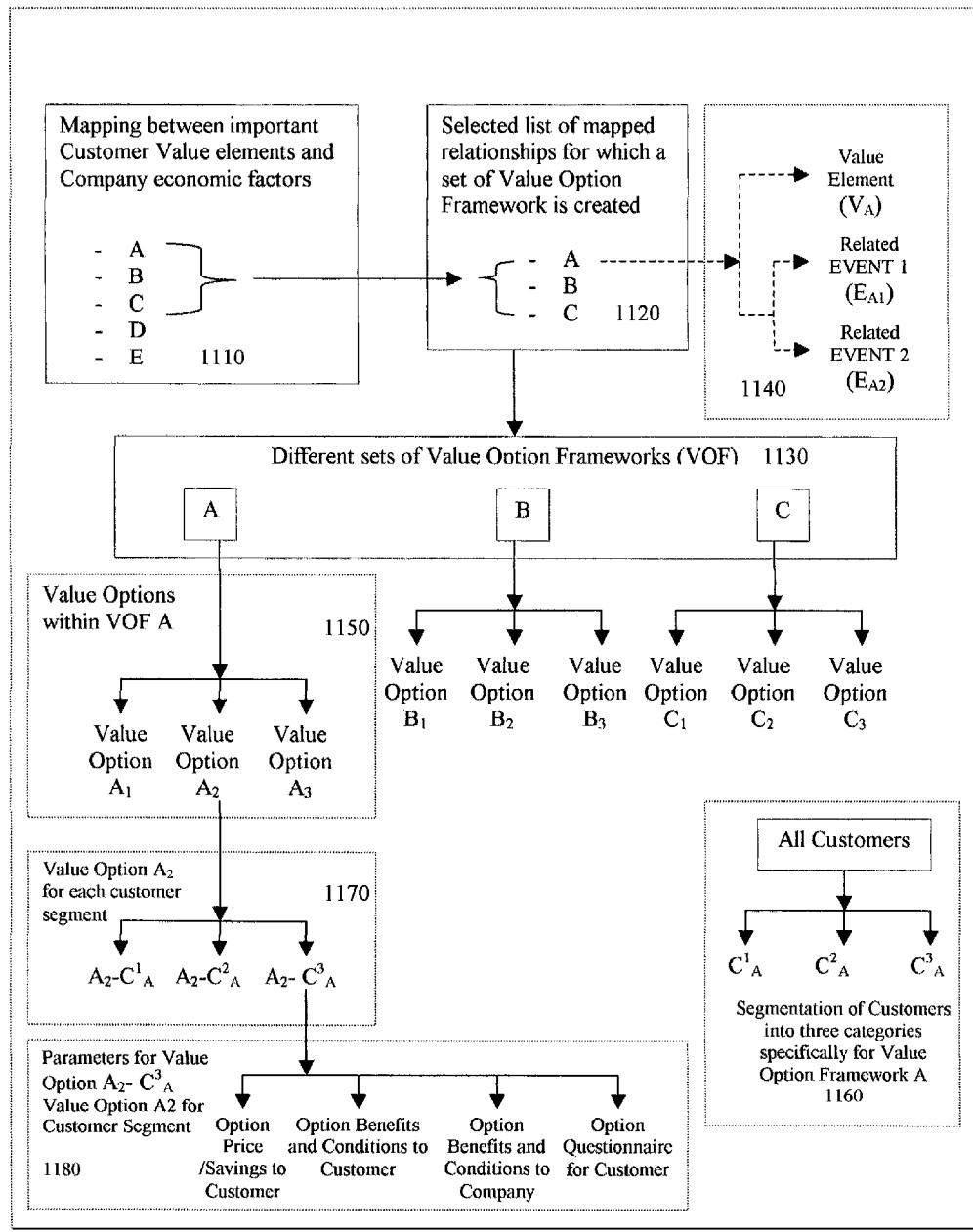
FIG. 11 is a partially-diagrammatic, partially-flow diagram representing the steps of a process for creating a value option framework.

(4) Formation of Value Options Framework:

The formation of a value options framework involves certain steps illustrated in FIG. 11. The value options framework is formed around important mapped value elements, allowing capture of detailed individual, customer-level data expressing needs, preferences, flexibilities and relative utilities so as to positively impact the company operations, while simultaneously enhancing the overall product utility for the customer. Since a correspondence has been drawn between those value elements and the corresponding economic factors, we are assured there is significance for both the customer and the company. A value option framework (VOF) must allow the company to capture a customer's demand, preferences, flexibilities and relative utilities at an individual level in a format that can allow that information to be used to produce a cost savings or revenue enhancement for company operations while concurrently enhancing customer utility. The structure of a value option framework is defined in detail later.

The process to create a value option framework is shown in greater detail in FIG. 11. Step 920, above, generated a list of mapped relationships. In step 1110, the process starts from that list. From this list, the company may select a list of mapped value elements which fulfill the criteria listed above, step 1120, and a value options framework is built around those value elements. One could build a value options framework around almost every mapped relationship, so the decision criteria to chose or reject any such relationship is simply pragmatics. It is probably to be desired to limit the number of relationships to keep the value options framework manageable, computationally and otherwise. In FIG. 11, there are three VOFs shown at 1130, namely A, B and C. The number of value option frameworks shown is for illustration purposes only and could be fewer or more, depending on factors such as the industry selected and user discretion. As explained in detail later, each value option framework is related to a corresponding value element and one or more related event(s). For illustration purpose, in the box 1140, value option framework A is related to a value element $V_A$ and two related events, $E_{A1}$ and $E_{A2}$. In most situations, after the initial interaction between the customer and company related to a particular value element, one or more related events (or a series of events) would take place. The structure of a value option framework is defined below in detail.

Figure 12:
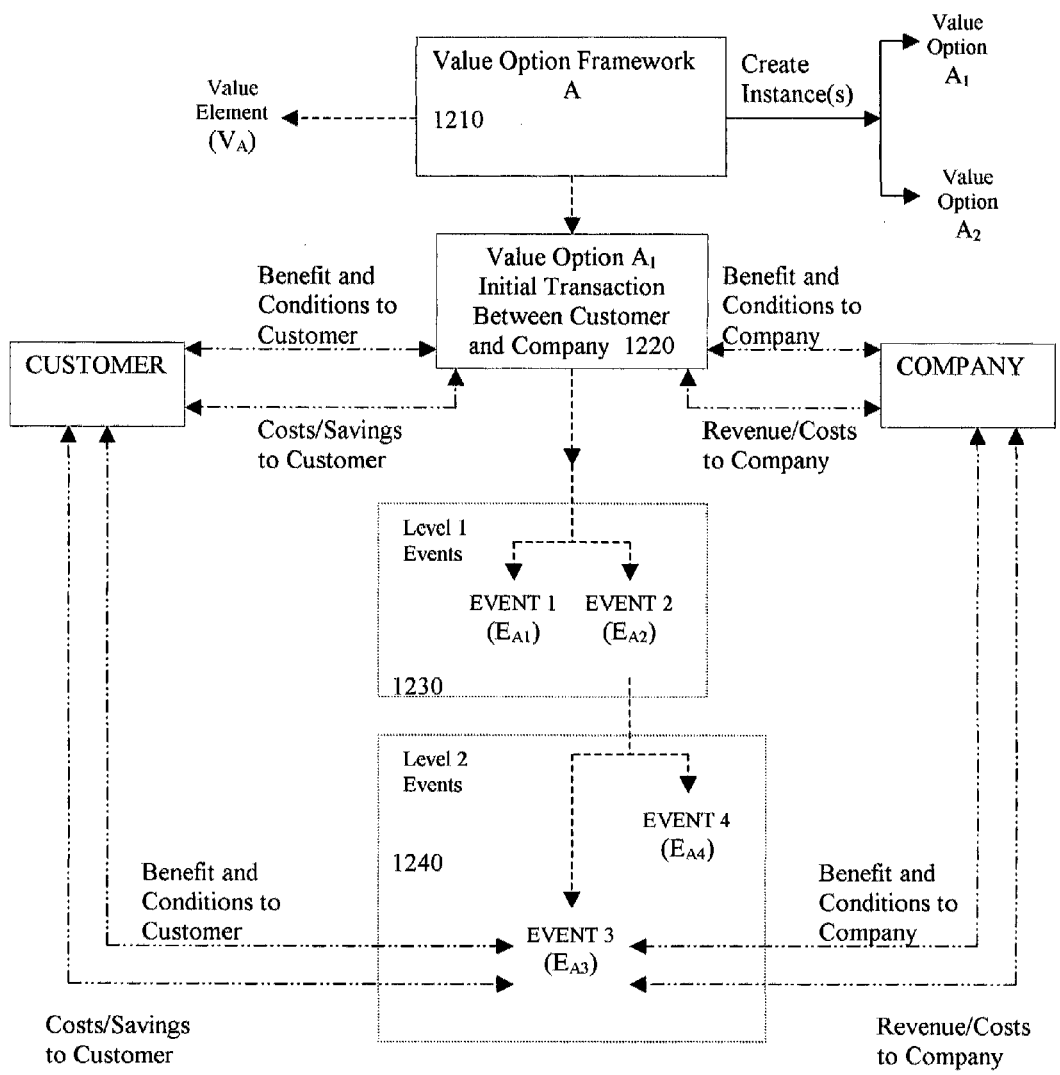
FIG. 12 is a diagrammatic representation of the generic structure of a value options framework.

Structure of a Value Option Framework:

FIG. 12 defines the structure of a Value Option Framework. The box 1210 shows a value option framework A. Every value option framework may be related to one or more value elements. As show in the box 1210, value option framework A is related to value element $V_A$. One can create one or more instances of a value option framework as shown by the two value options ($A_1$ and $A_2$). The box 1220 shows the initial interaction between the customer and company where the company offers the value option $A_1$ to the customer. Every value option has an initial costs/savings and other benefits and conditions to the customer; and revenue/costs and other benefits and conditions to the company. The initial transaction is successful if the customer selects the given value option. Every successful transaction may be succeeded by one or more related events (or a series of events as shown by the boxes 1230 (Level 1 events) and 1240 (Level 2 events). Just like the initial transaction, each event may also have costs/savings and benefits and conditions to the customer, and revenue/costs and benefits and conditions to the company, as shown by the linked arrows from Event $E_{A3}$ to both the customer and company. If a particular event takes place after a successful transaction, the corresponding costs/savings and benefits and conditions are applied to both the company and customer.

Consider, again, the process of formulating a value option framework. For each value option framework, the company-user also preferably categorizes its population of customers into one or more segments based on one or more criteria. Customer segmentation is based on customer behavior and needs. Individual customers are not necessarily segmented or grouped; a particular customer may fall within different customer segments at different times. It is the customer behaviors and needs that are segmented. To provide an example, in the box 1160 in FIG. 11, all of the company customers are categorized into three customer segments, namely, $C^1_A$, $C^2_A$, $C^3_A$ for the value option framework A. The number of customer segments could vary depending on the industry and value option framework, and this method does not put a limit on the number of customer segments. The number of customer segments shown is for illustration purposes only and could be fewer than or more depending on industry selected, value option framework and user discretion. Further, a company may segment its customers differently for different value option frameworks or they may use the same customer segmentation for a few or all value option frameworks. The customer segmentation is done because the customer behavior can be subdivided into different groups and customer showing similar behavior could be dealt in a similar fashion.

After formulating one or more sets of value option framework(s) around the selected value elements, the user creates one or more value options for each set of value option frameworks. In FIG. 11, the value option options $A_1$, $A_2$ and $A_3$ are created in box 1150 for the value option framework A. The number of value options shown is for illustration purposes only and could be fewer or more depending on industry selected, value option framework and user discretion.

For each value option created, the user defines parameters for option pricing, benefits and conditions to the customer, as well as revenue, costs and option conditions to the company, under which the option would be used. If necessary, a user may also need to create a separate questionnaire to be completed by customers, pertaining to each value option.

As shown in FIG. 11, the user creates value options for each particular customer segment. Step 1170. In FIG. 11, the structure for value option conditions for Value Option $A_2$ tailored to customer segment $C^3_A$ is shown in the box 1180. Similarly, the user creates conditions and parameter values for each value option for each customer segment.

For one type of value option, one or more parameters for different customer segments may be the same. Across multiple value options (within the same value option framework), one or more parameter values may be the same for one or more different customer segments. It is possible that one or more value options may not be valid for a particular customer segment or a sub-segment within a customer segment.

Figure 13:
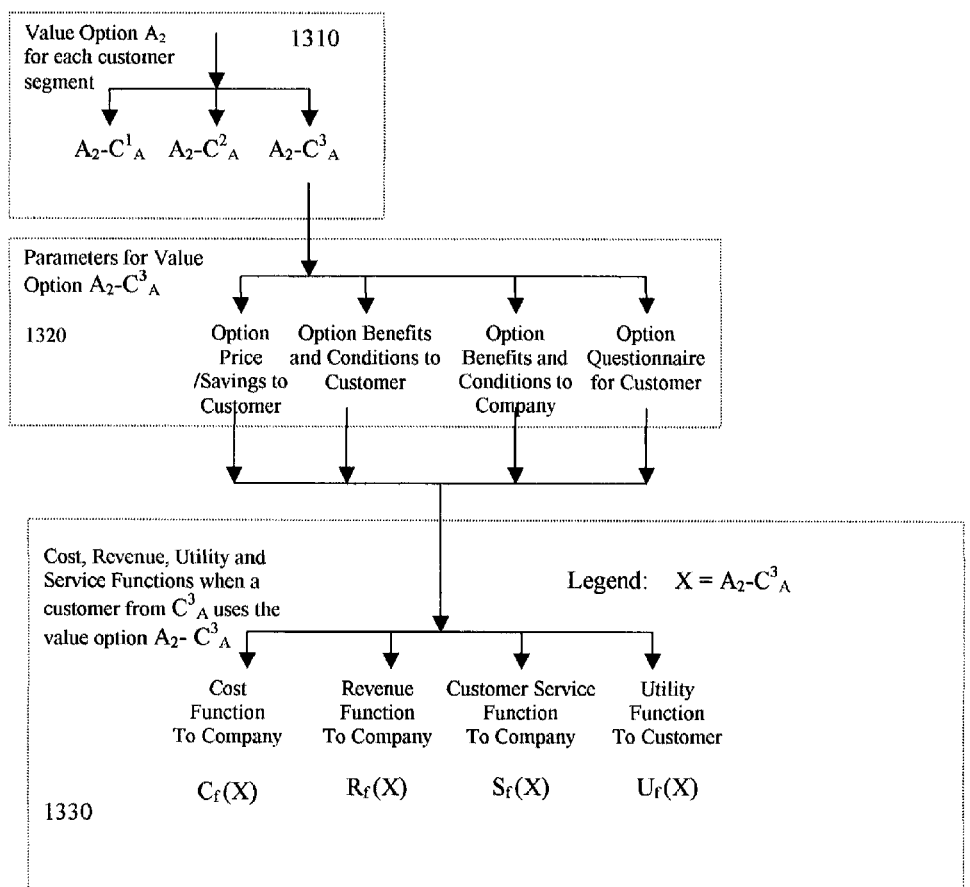
FIG. 13 is a diagrammatic illustration showing creation of a value option framework indicating how cost, revenue, utility and service functions.

Turning to FIG. 13, for each value option created for a specific customer segment, the user creates the following functions as shown in the box 1330. (The number and type of functions shown is for illustration purposes only and could be fewer than or more depending on the industry selected, the value option framework and user discretion.) First, there is a Cost Function to the company, $C_f(X)$. This function expresses the cost elements to the company related to usage of a specific value option. For illustration purposes, FIG. 13 displays the cost function $[C_f(A_2-C^3_A)]$ to the company when a customer (within customer segment $C^3_A$) selects the value option $A_2$. This function expresses the costs to the company initially when the user selects the value option A2, and also for each of the related events if and when those related events take place. Next, there is a Revenue Function to the company, $R_f(X)$. This function expresses the revenue elements to the company related to usage of a specific value option. For illustration purposes, FIG. 13 displays the revenue function $[R_f(A_2-C^3_A)]$ to the company when a customer (within customer segment $C^3_A$) uses the value option $A_2$. This function expresses the revenue to the company initially when the user selects the value option A2, and also for each of the related events if and when those related events take place. Then there is a Customer Service Function to the company. This function expresses the customer service function to the company related to usage of a specific value option. For illustration purposes, FIG. 13 displays the customer service function $[S_f(A_2-C^3_A)]$ to the company when a customer (within customer segment $C^3_A$) uses the value option $A_2$. This function expresses the customer service level a company provides initially when the user selects the value option $A_2$, and also for each of the related events, if and when those related event take place. Finally, there is a Utility function to the customer: This function expresses the utility to the customer from use of a specific value option. For illustration purposes, FIG. 13 displays the utility function $[U_f(A_2-C^3_A)]$ to a customer (within customer segment $C^3_A$) when he or she uses the value option $A_2$. This function expresses the utility to a customer initially when he/she selects the value option $A_2$, and also for each of the related events if and when those related events take place.

To obtain the overall costs, revenue and service benefit for a particular value option framework, all the individual functions for each value option-customer segment combination are combined to determine the total overall costs and revenue benefits to the company and the service and utility benefits to customers. Benefits from all the value option frameworks can be simply added together to calculate total overall benefit values to the company.

Example of Formulating a Value Option Framework in the Airline Industry

Figure 14:
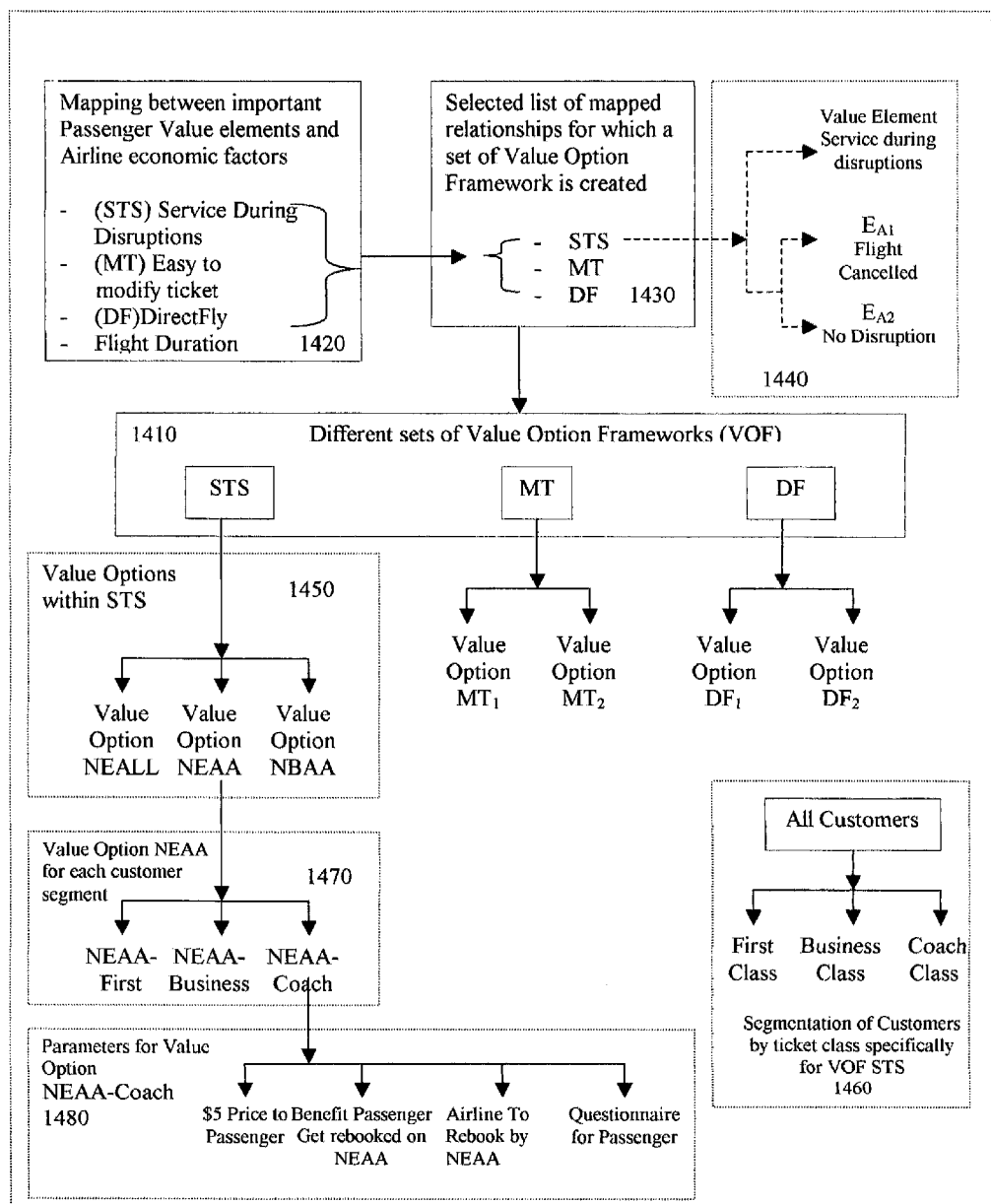
FIG. 14 is a diagrammatic illustration of the development of a value options framework within the airline industry.

As shown in the box 1410 in FIG. 14 three value option frameworks are created, namely, Smooth Travel Service Value Options (STS), Easy to Modify, or MT, options) and DirectFly (DF) options are created. The MT framework is related to the value element "ease to modify ticket," whereas the DirectFly option framework is related to the value element "number of connections." Details on MT and DirectFly option frameworks are provided later.

The STS framework is created based on a value element "Service during disruptions." More specifically, as at 1420, a mapping is performed between important passenger value elements and airline economic factors. From that mapping, selected list is created of mapped relationships for which a set of value option frameworks will be created, as at 1430. The value element "service during disruptions" is extracted, as at 1440 and three value options within STS are created as instances of the STS framework, at 1450.

The STS framework provides three smooth travel service options to passengers when they buy their original tickets, to enable passengers to tailor the service provided to them in the event of a flight cancellation. FIG. 14 at box 1440 shows the related events to the STS framework. One related event is "no disruption," and the other is "flight cancellation".

Each of the three STS value options is geared to provide a different level of services if a passenger faces a flight cancellation. If a customer selects the NEALL option (Next Earliest Available Flight on All Airlines), he is rebooked on the next earliest available flight from all different carriers operating out of the passenger's original departure airport. If a customer selects the NEAA option (Next Earliest Available Flight on Original Airline), he is rebooked on the next earliest available flight from the passenger's original carrier operating out of the passenger's original departure airport. If a customer selects the NBAA option (Next Best Available Flight on Original Airline), he is rebooked on the next best available flight from the passenger's original carrier operating out of the passenger's original departure airport.

Structure of STS Value Option Framework

Figure 15:
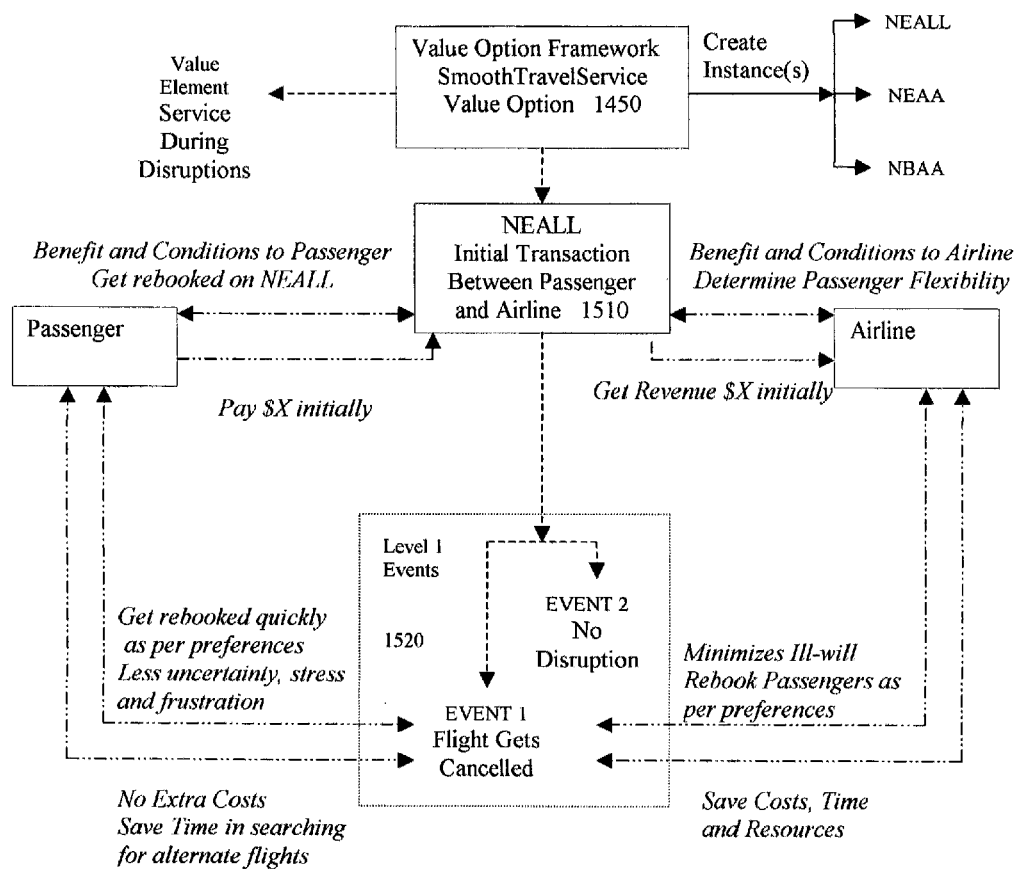
FIG. 15 is a diagrammatic illustration of the Structure of the STS Value Option framework for the airline industry with the NEALL selection.

FIG. 15 displays the structure of an illustrative STS value option framework for the airline industry and, in particular, the NEALL option indicated at box 1510. In a successful initial transaction for NEALL, a passenger pays $X to the airline to select the NEALL option, and in return receives the airline's service commitment to rebook him on the next earliest available flight on all carriers, if the original flight gets disrupted or cancelled. The company, on the other hand, gets to know the relative flexibilities in passengers travel needs as some passengers purchase this option and others don't. The assumption here is that passengers make a logical decision to choose the NEALL option if their travel is very time sensitive or if they want the highest level of certainty in their travel. Once the initial transaction is successful, there could be two possible related events as shown by the box 1520, namely, 1) the flight goes smoothly without disruption (shown by $E_{A2}$) and 2) the flight gets cancelled (shown by $E_{A1}$). If $E_{A1}$ happens, then the passengers who had selected the NEALL option are automatically rebooked as per the conditions of the NEALL option. This leads to savings and benefits to the airline as well as benefits to the customer. As shown, there are no additional costs for the customer as a result of this event; in fact, he or she saves search time and effort on looking for alternate flights. The customer gets rebooked quickly and in accordance with the preferences generating those benefits. The company can better optimize its re-bookings and may possibly reduce its overall costs generating a cost benefit. The costs, revenues, benefits and conditions shown here are for illustration purposes only and actual values could be different depending on specific values selected by the user for value options, passenger behavior, airline schedule and some other factors.

Figure 16:
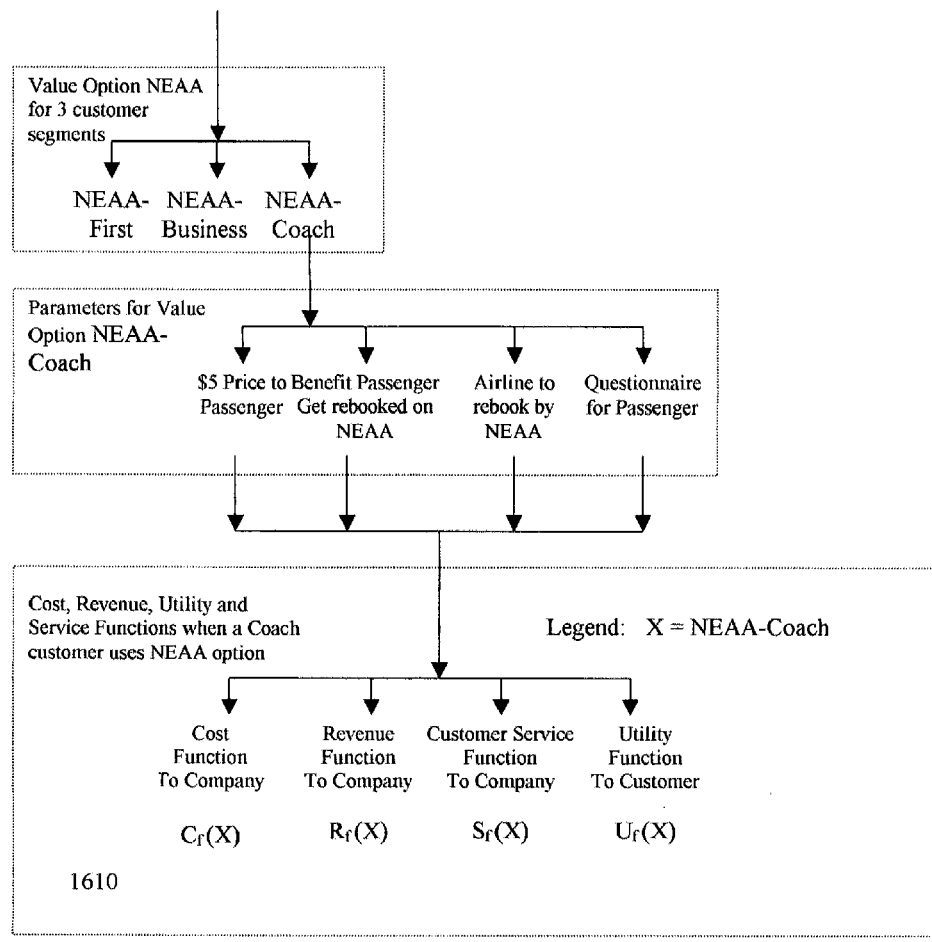
FIG. 16 is a diagrammatic illustration of how the cost, revenue, utility and service functions are structured for the NEAA-coach value option.

Turning back to FIG. 14, the next step, as shown in box 1460, is to categorize all the passengers of the airline into three segments—for example, based on the ticket class. It is assumed the airline has three ticket classes in operation, namely, first class, business class and coach class (clearly, fewer or more classes can be accommodated). Then the three value options are created for each of the three customer segments, leading to total of 9 value options. For the sake of simplicity, box 1470 shows only the three value options for the NEAA value option for each customer segment. The next step is to assign different parameter values of each value option related to pricing, benefits and conditions to customer and company for the initial transaction and for each of the two related events. For the sake of simplicity, the box 1480 shows this step only for the NEAA-Coach value option. Turning to FIG. 16, the box 1610, shows the different costs, revenue, service and utility function for the company and the customer.

A cancelled flight reduces an airline's capacity, while the demand builds up; this leads to a natural supply and demand problem. In most situations, after a flight is cancelled, the cancelled passengers cannot all travel at the same time because there may not be seat availability to permit this solution. Currently, an airline spends a lot of resources and time in sorting through the list of passengers and rebooking all of them. This leads to long waiting times, uncertainty, stress and frustration for passengers. This problem could be solved if an airline could use the new method and system taught above to determine in advance the passengers' relative flexibilities and then rebook them accordingly, while minimizing airline costs. The value option listed in FIG. 14 can help an airline to determine relative flexibility at an individual customer level. A software application based on the architecture, as explained in FIG. 2, can be used to capture this additional customer information and then an Event Optimizer module can rebook passengers according to their needs and while minimizing the costs for the airline. Handling passengers in such an efficient and effective fashion creates goodwill for the airline, and they could easily charge a premium for certain value options while offering other options at no cost to customer.

Figure 10:
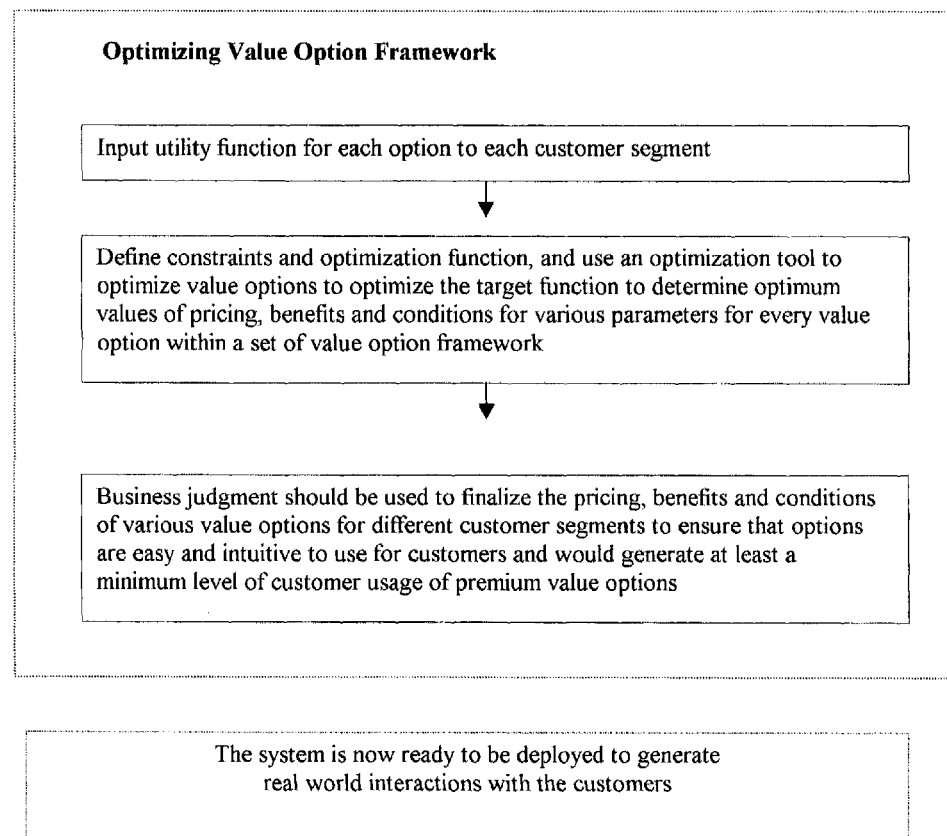
FIG. 10 is a flow chart illustrating optimization of a value option framework.

5) Optimization of Value Options:

As an optional last step in the first stage, as shown in FIG. 10, a financial analysis may be performed on the value option framework using the existing company and customer data to determine optimum pricing values and conditions of the value options. In other words, a company using the system and method can build utility functions based on cost and benefit equations of various options, and then can optimize across any one or combination of such functions. Any standard non-linear constrained optimization software tool can be used to run iterations to determine optimized pricing and benefit values for different value options. Using standard sensitivity and scenario analysis techniques, a user can run what-if scenarios to determine the robustness of the value option framework. These types of analyses can help a user to take a better decision in choosing the final parameter values for value options. It is not necessary to perform this optimization to generate benefit from the new method and system taught above. A user would tend to generate benefit even if no or little optimization is performed at this level. However, performing optimization at this level may tend to increase the benefit derived.

Second Stage: Using Value Option Framework

After completing the first stage of the method, the user has been able to create important value option frameworks and specific value options within those frameworks. The user has also segmented customers and prepared a questionnaire, if needed, to be associated with each specific value option that may be applicable to each customer segment. The company is fully prepared now to use a structured format consisting of value options and questionnaire to interact with its customers in real time to generate benefits for both customer and company.

The second stage of the new system and method, as depicted in FIG. 17, involves using the value option framework to interact with the customer to capture his or her requirements in detail. Once the customer selects a particular option, the system moves to the Event Optimizer stage, 1730, where the system reacts based on the event that may take place. The Event Optimizer, depending on the event, invokes an optimization algorithm, assesses the company operations in real time and optimizes across company operations and customer information to produce results that concurrently maximize the benefits for the company and the customer. The optimization may or may not modify the company product offerings to better suit the customer while simultaneously maximizing the company operations. Both of these steps will now be discussed in detail.

1. Dynamic Interaction to Determine Customer Demand in Detail (Step 1720):

In this step, the company interacts with its customers in a structured format asking questions and/or offering value options. Preferably, this interaction occurs using a web-based data collection system. As stated above while an Internet based interaction is probably the most cost-effective approach to data collection, other methods may be employed, if preferred, or a combination of methods may be used.

On a browser, which accesses the seller's (i.e., company's) web site, a series of questions are presented to the customer and the customer supplies answers. These questions may also present value options and ask the customer to answer and select the options that suit them the best, enabling the company to determine detailed preferences and flexibilities in customer needs. The questions/value options are supplied from the database 210 based on the value options framework created in the first stage to deal with different customer segments.

Figure 18:
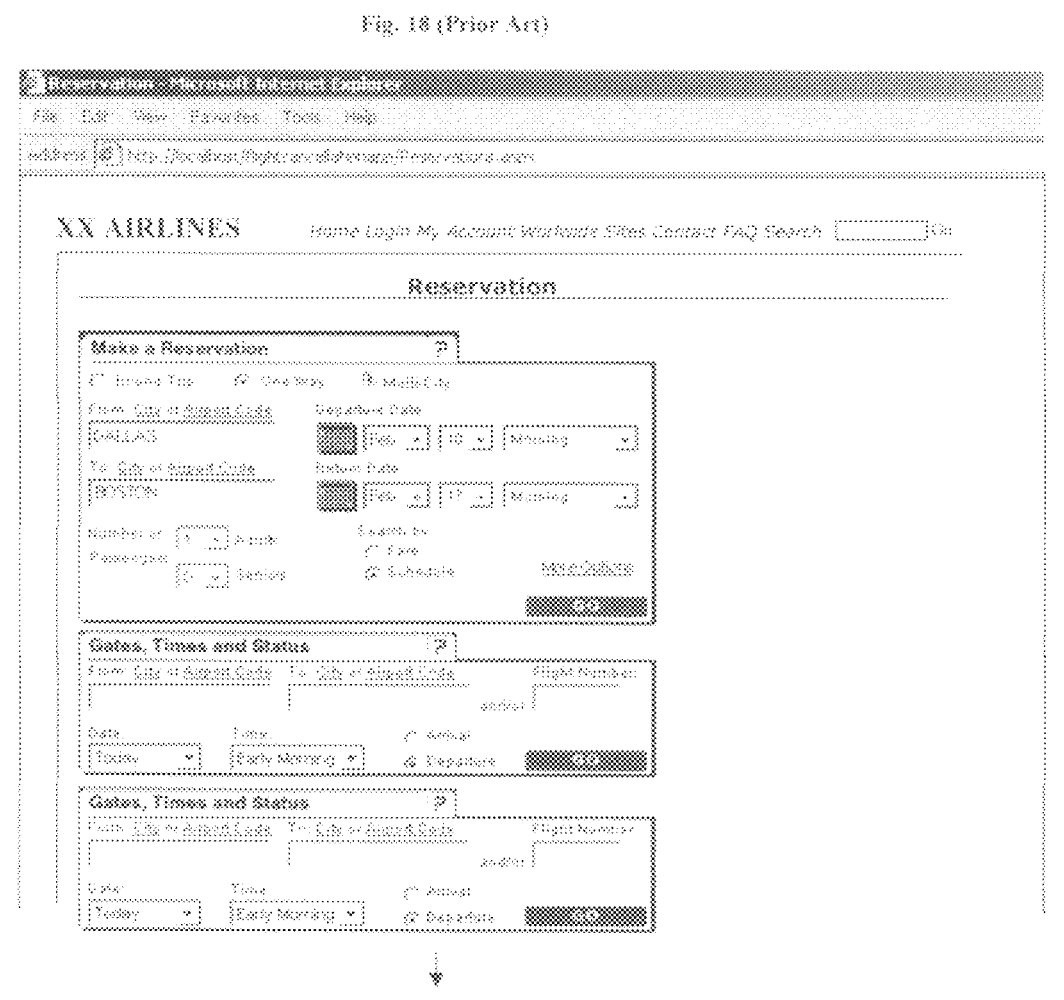
Figure 18:
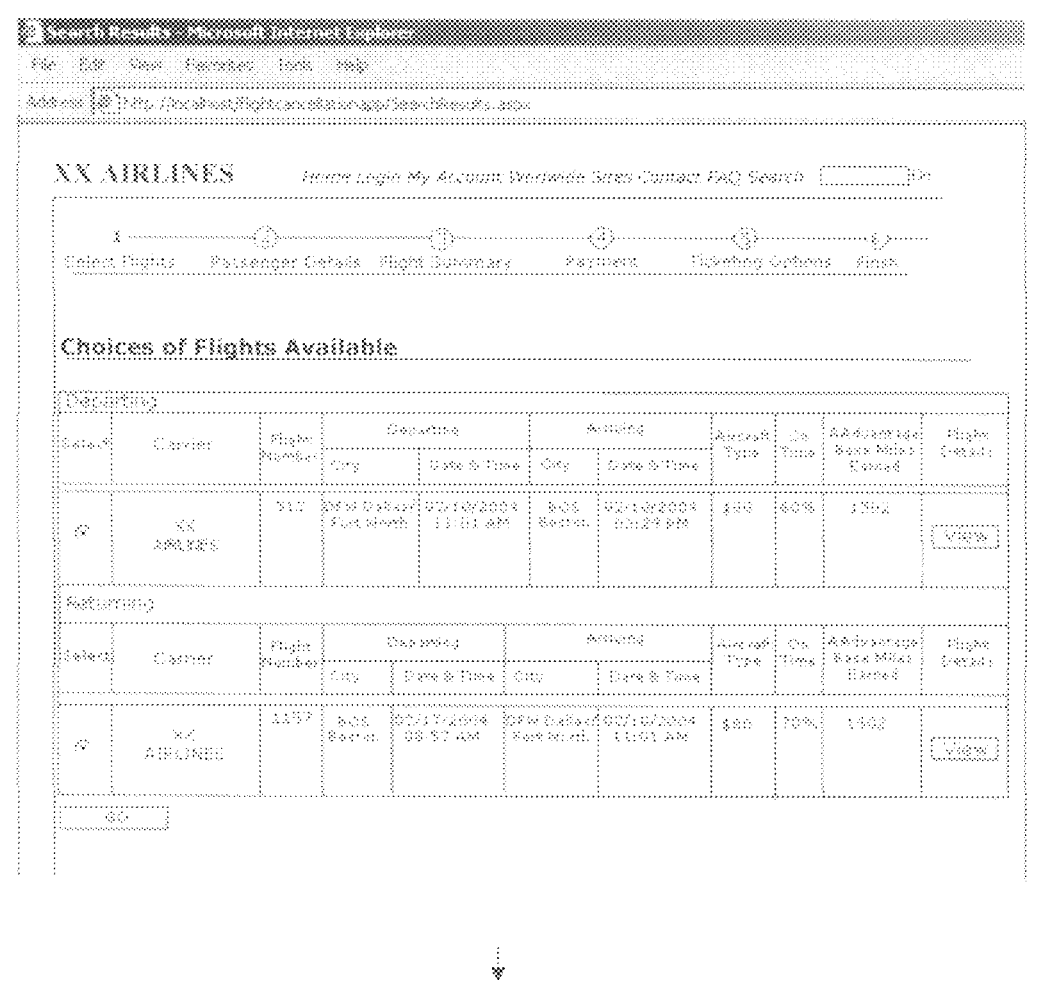
Figure 19:
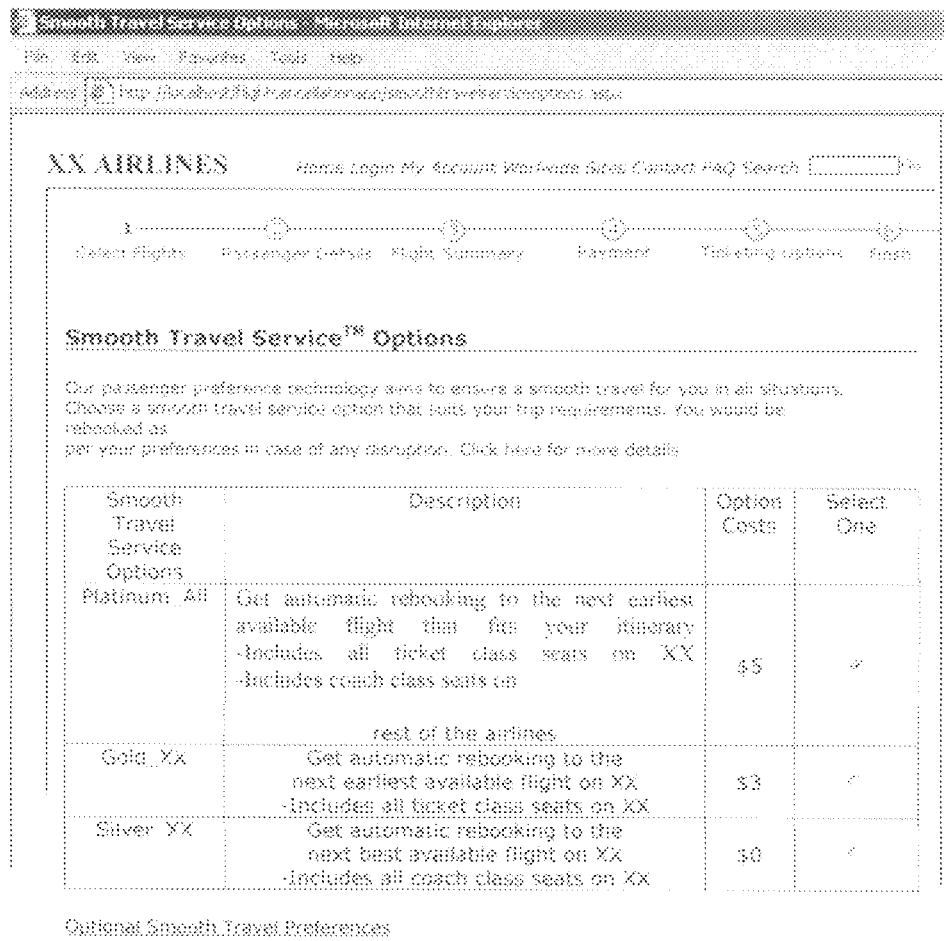
FIG. 19 is a simulated screen shot illustrating how an airline would interact with a customer related to the STS value option framework.

Continuing with the airline example, FIGS. 18 and 19 display web pages that provide a real world example of how the interaction may take place between the customers and the airline when using the new system and method. To site a particular example for a known well established airline, American Airlines is used as an example. FIG. 18 shows two webpages where customers may search and select a particular combination of flights for their trips. After selecting a particular trip itinerary, the customers would reach the webpage in FIG. 19, where they would be asked to choose a SmoothTravelService Option that suits them the best.

These value options allow the passenger to tailor the services in event of a flight cancellation. Each of the presented value options provides some benefit and costs to the passenger. There may be a default option that provides the standard service at no cost to the passenger. If the passenger does not select any option, the system may select default. The prices and conditions listed for each value option displayed on the web page may be a function of the profile of the customer who is accessing the page and the ticket he has selected so far. If a customer does not select any particular value option, the software automatically may select and assign the default option (the default option is Silver_AA in this case) to the passenger's itinerary. If the user selects any of the other two premium options, then he pays the option price listed in front of those options at the time of booking of the ticket. In this fashion, the value options enable the airline to determine relative flexibility in individual passengers' travel needs.

(2) Event Optimizer:

Once the customer selects a value option, the system goes to the Event Optimizer phase where different steps are executed depending on the event that may occur. The event(s) is(are) related to the value option selected in the first step.

Figure 20:
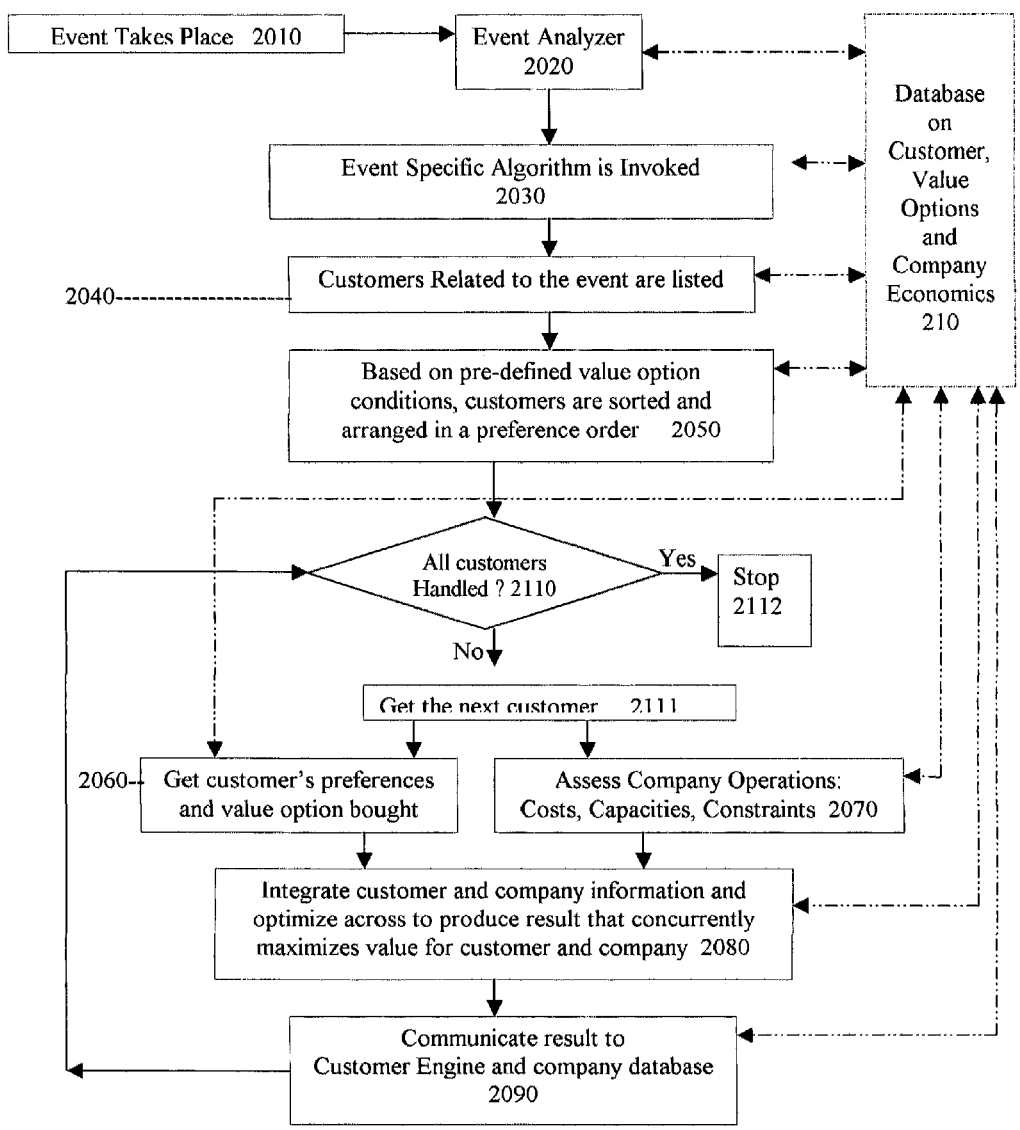
FIG. 20 is a diagrammatic illustration showing generally how an event is processed by the system and method shown, to fulfill a company's obligations to its customers as shown herein, delivering optimized results to the company and the customers.

Turning to FIG. 20, the typical Event Optimizer architecture is shown. An Event Analyzer 2020 is a module that receives notifications of events and notes when a monitored event occurs. Event Optimizer 2010 analyzes the event and invokes an optimization algorithm specific to the event that is detected. Using that algorithm, the Event Optimizer collects the information on related customers and assesses the company operations in real time. A third step takes the information collected from the previous two steps and uses predetermined criteria to optimize company operations along with customer demand. In this step, the various scenarios are generated which optimize the total product value for the customer and profits and gains for the company. More details on the Event Optimizer are provided in the System Architecture section.

A user may create a value option framework, which includes a series of events. In this case, the Event Optimizer, after optimizing the result for the first event, may offer the results to the customer. The customer may or may not accept the results. If the customer does not accept the result the Event Optimizer may move on to handle other subsequent related events, and may again come back to the customer with more results. This process could be repeated several times depending on industry selected, the configuration and type of value option framework, and customer behavior. Some of the value option framework examples that may follow this pattern are listed later. These include value option frameworks such as, for example, a target price option, a cyclic buy option and a volume buy option.

The Event Optimizer may be better understood with the help of the ongoing airline industry example. The Event Optimizer in the airline flight cancellation example invokes the optimization algorithm, called the Rebook Optimizer, since it optimizes the rebooking for cancelled passengers. Details on the Rebook Optimizer are provided in the system architecture section.

Summary of Second Stage

In the second stage of the new method and system, the company interacts with the customer in a structured format to capture customer needs, preferences, flexibilities and relative utilities in detail. The next stage involves an Event Optimizer as explained above. The customers associated with the event are enlisted and sorted by pre-defined criteria. The Event Optimizer collects customer information from the database and also assesses company operations in real time before integrating this information to produce one or more optimized results that concurrently maximize the benefits for the customer and company.

Continuing the airline example, if the customer flight is cancelled or about to get cancelled, the Event Optimizer is invoked. The Event Optimizer analyzes the cancelled flight event, and invokes the rebook algorithm. The rebook algorithm collects all the related cancelled passengers and their information and assesses the airline operations (flight status, availability, costs etc.) in real time. Passengers are sorted in a preference order based on pre-defined criteria. The rebook algorithm then integrates the individual passenger preferences with the airline operations information and optimizes across the data to produce one or more optimized itineraries that satisfy individual passenger needs as well as concurrently maximizing gains for the airline. In this fashion, both the airline and passenger benefit at the same time by using the new system and method.

System Architecture: to Use and Implement Instance of Method

The system architecture as shown in FIG. 2 may be used to implement the new system and method taught above.

The Value Option Creator allows the user to create and configure different value options that can be offered to the customers to capture their needs and preferences in detail and in a way that can be used to optimize across company operations. The Event Optimizer allows the company to optimize across company operations and customer needs when an event is triggered to provide a product offering that maximizes both customer utility and company profitability. A company would use the Customer Engine to interact with its customers via different channels. Each of these three sections is defined below in detail.

Customer Engine

The Customer Engine provides different interfaces that a company maintains at different channels, which are utilized to interact with the customers. These channels may include but are not limited to the company's website via the Internet, the company's call center via phone, and the company's retail outlet via in-person. The Customer Engine enables the company to ask questions and/or offer value options to customers in a pre-configured structured format. The Customer Engine generates its interfaces based on the data stored in the database and populated by the Value Option Creator. The customers provide their responses and select value options that suit them. The Customer Engine then communicates back and stores customer responses and selections in the database. The Customer Engine also may communicate the optimized results to the customer as and when generated by the Event Optimizer.

An example of the Customer Engine interface to deal with the STS framework in the airline industry is provided in FIGS. 18 and 19. It provides customers buying tickets on an airline's website with different SmoothTravelService value options.

Value Option Creator (VOC)

The Value Option Creator allows a company to design, create and configure different value option frameworks and corresponding value options that can be offered to a customer to capture his or her needs and preferences in detail and in a way that can be used to achieve optimization across company operations. A company would use the Value Option Creator module to perform some or all of the following:

Develop various value option frameworks based on selected value elements and corresponding company economic factors.

Segment customers by one or more criteria. A customer segment may include one or more customers.

Develop costs, revenue and service functions based on a company's operations prior to using the herein-described system and method. Each company preferably will be able to express cost elements in a real-time (i.e., up to date) dynamic fashion to be able to fully assess the profitability or contribution of each product sale opportunity.

Develop various value options within each value option framework.

Configure each value option differently (or keep it the same) for different customer segments. This involves choosing pricing, benefit conditions and the proper questionnaire for each value option for different customers.

Develop costs, revenue and service functions after the user (company) has designed and configured various value option frameworks.

To measure in real time or in quasi-real time the value benefit created for the passenger and/or company by implementing the new system and method in part or in full.

Optimize each value option framework and associated value options to determine optimized pricing and benefit schemes for the value options, in order to maximize the benefit for both the company and customers. What-if scenarios may be run to test the robustness of the value option frameworks' models.

The Value Option Creator (VOC) intakes the cost functions (marginal and total), revenue functions, utility functions, customer segments, capacity (scheduled and available) functions and other economic factor functions of the company. The VOC can be configured to store various customer value segments on which a user may want to build value option framework and associated value options. A user can also enter the constraints and ranges to perform pricing optimization to determine optimum pricing and the benefits of various options.

Ideally, a user may be able to create a Value Option Creator that is industry-and company-independent and can be used in several industries. Due to time and resource constraints, however, it is perfectly satisfactory for a user to build a less scalable and flexible industry-specific Value Option Creator.

Event Optimizer

The Event Optimizer allows the company to optimize its "bottom line" across company operations and customer needs, when an event is triggered. This is achieved by providing a product offering that maximizes both customer utility and company profitability. A suitable system architecture (i.e., overall flow) for the Event Optimizer in shown in FIG. 20. The following describes each step in detail:

The Event Optimizer may start its functioning when a particular event is triggered (i.e., occurs and is detected), Step 2010. The Event Analyzer (2020) analyzes the type and category of the triggered event by matching it with the list of events listed in database 210. Once the event type is determined, the Event Analyzer searches the database for an optimization algorithm that is associated with the triggered event, and executes that algorithm. (Such algorithims, naturally, have been developed and stored in the database at an earlier time.) The algorithm collects from the database a list of the customers that are associated with the triggered event, Step 2040, and sorts them based on pre-defined criteria listed in the value option framework associated with the event, Step 2050. The first customer is taken from the sorted list and his or her preferences and value option selection are retrieved from the database. Step 2060. The algorithm then makes a real-time assessment of the company operations to get up-to-date costs, capacities and constraints. Step 2070. The information collected in the above two steps is then integrated (Step 2080) and, based on a pre-defined criteria, the algorithm optimizes across the company information and customer preferences to produce one or more results that concurrently maximize the benefit for both the company and the customer. The results are preferably communicated to the Customer Engine and to database 210, Step 2090. These steps are repeated until all the customers have been taken care of Steps 2110-12.

Figure 22:
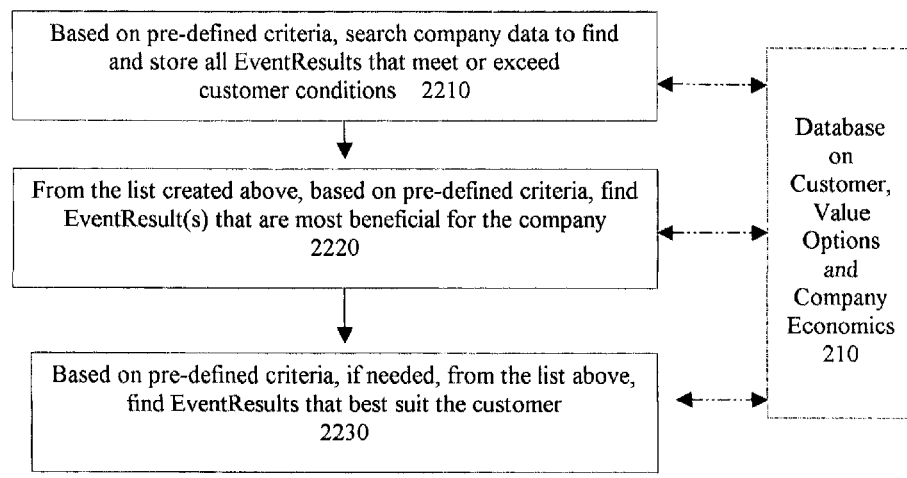
FIG. 22 is a flow chart expanding step 2080 of FIG. 20.

FIG. 22 expands the step 2080 to show the detailed substeps. The first step (Step 2210) is to search the company data, based on pre-defined criteria, to determine and store all EventResults that meet or exceed the customer conditions (based on the value option selected and other preferences). An EventResult is a potential resultant output of an event to the customer and the company. The next step (Step 2220) is to determine from the stored list, those EventResults that are most beneficial to the company. If needed, another step (Step 2230) is performed to determine from the selected EventResults from the Step 2220, those results that best suit the customer.

Depending on the event type and related value option framework, the event-specific algorithm may communicate optimized results to the customer one or more times, depending on the algorithm and customer behavior.

Figure 21:
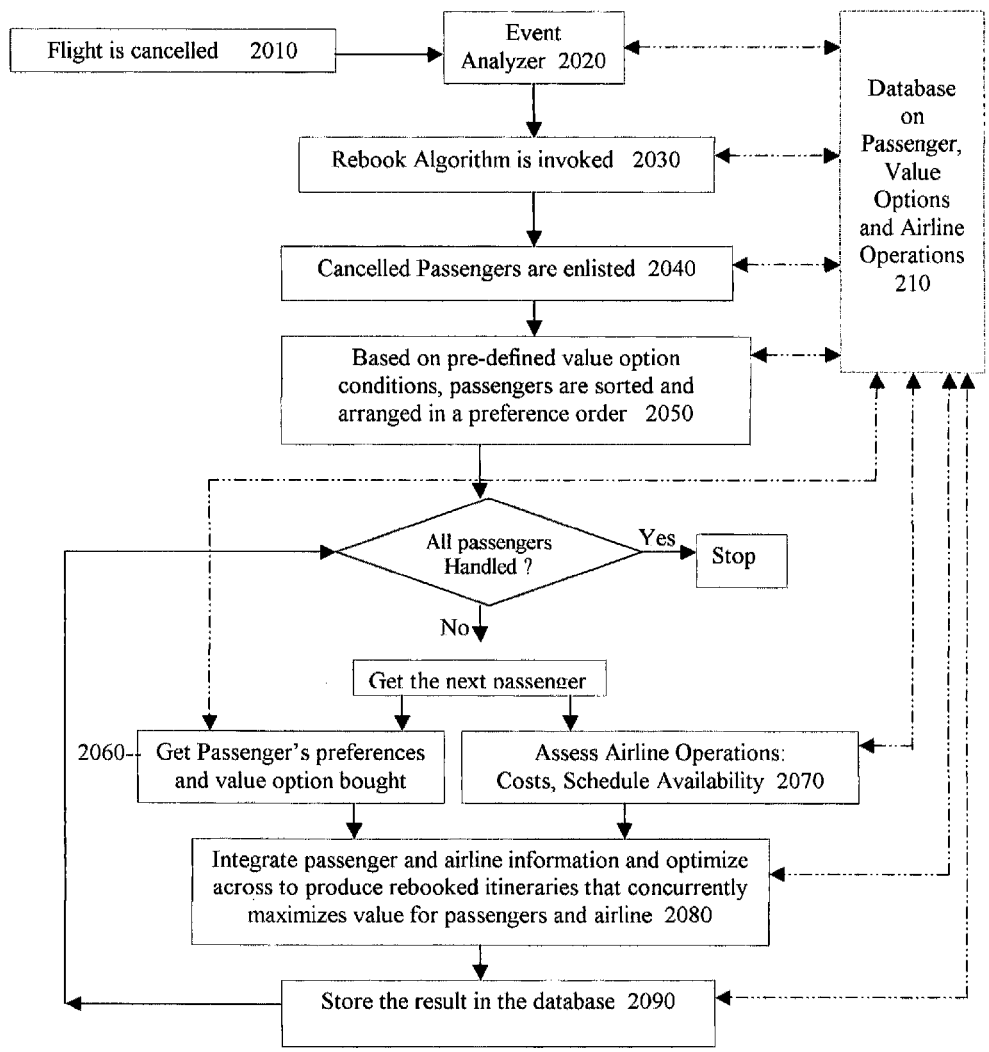
FIG. 21 is a counterpart to FIG. 20 dealing specifically with flight cancellation and rebooking.

Turning to FIG. 21, there is shown a detailed view of how an Event Optimizer would work in case of the STS framework example in the airline industry. There are two events associated with the STS framework, a flight executes smoothly or gets cancelled. If the cancellation event happens (Step 2010), the Event Analyzer 2020 analyzes the event and searches for the associated optimization algorithm, which in this case is the Rebook Optimizer (called simply "rebook" from here on) 2030. Once invoked, the Rebook Optimizer searches for all the passengers on the cancelled flight (2040) and sorts them (2050) using pre-defined criteria. The Rebook Optimizer determines the personal preferences and value option selections for the first passenger in the list (2060) and assesses the airline operations in real time or quasi-real-time (2070), including flight status, seats booked, available seats on different flights, costs per passenger mile, marginal costs per passenger mile, costs of flight cancellation and other pre-assigned parameters. In the next step 2080, the Rebook Optimizer operation integrates the real time airline information with the passenger preferences and value option selection and optimizes across both to produce one or more optimized rebooked itineraries. On one hand, the rebooked itineraries meet or exceed the benefits provided to the passenger through the selected value option. Concurrently, on the other hand, the Rebook Optimizer optimizes the costs and schedule for the airline. In this fashion, both the passenger and the airline benefit at the same time. After rebooking one passenger, the rebooking procedure moves on to the next passenger in the list and performs the same above steps until all the passengers are rebooked optimally. Finally, the results are communicated to the passengers through the Customer Engine, and to database 210 (step 2090).

In the above STS example, there could be several ways to implement the rebooking algorithm. For example, in some cases, the rebooking procedure may generate more than one itinerary for the passenger. The Customer Engine may then present all those itineraries to the passenger, for selecting one that best fits his/her needs. In another case, the Rebook Optimizer may only generate one optimized itinerary; hence, the passenger does not get a choice. In this case, if the passenger does not like the rebooked itinerary, he/she can always approach the airline via other means (customer service desk/check-in counter at the airport or reservation call center) to get his rebooked itinerary modified manually.

Benefit of Using the System and Method

Factoring the customer preferences into a scheduling model keeps efficiencies high and costs low for the company. By rewarding customers for their cooperation and actions, companies can allocate expenses as rewards instead of incurring pure losses with accompanying ill will and inefficiencies.

By maximizing total value for its customers, a company can greatly improve its overall business prospects. The company can look to build very high customer retention rates and also increase the number of new customers gained per unit time. It can help to increase the overall sales and thus help increase the overall business value. The company may distribute a portion of additional value gained back to its customers to further strengthen its relationships with them, if it wishes.

A company may encourage customers to "opt in" to this system and provide the customer's preferences by giving rewards to customers to provide these preferences and commit early. The value options may be created and priced to motivate customers to make choices that both satisfy their needs and simultaneously allow the company to improve its operations.

Through this method, a new efficient approach is introduced for managing customer relationships, sales cycles, marketing, customer service, market research and customer feedback. It eliminates manual, time-consuming processes and replaces those with an efficient, automatic process.

This method further adds new dimensions to business parameters like inventory. Previously, for a company, inventory was either "Committed" or "Available." This method adds a new dimension of "flexibility." With the customer preferences and needs taken beforehand, we add the dimension of flexibility to the inventory. For example, a booked flight seat would conventionally be called committed inventory. But now within the new methodology, if the ticket-holding passenger is flexible, his ticket could fall into a pool of flexible inventory availability, which could be sold to other passengers if necessary.

Another advantage is that the method creates a new type of inventory, called customer inventory. Once the method had been used for some period of time, a company, by using its powerful value option framework, would be able to capture its customers' and potential customers' future needs in advance. In other words, within the realm of company product offerings, the company would collect information on which customers want to purchase what products, when and with what specifications or parameters. Combining this individual customer data across thousands of customers would generate a customer needs and preference database with appropriate classification and parameters. The needs (and/or preferences) of this database could be classified as customer inventory wherein the items in inventory are the needs of several groups of customer with similar needs. Once the company has built such a database, they can use the customer inventory as and when needed in optimizing their internal operations to maximize value for both the company and the customers.

The method allows a company to move from a knowledge-based system to an expert system, which optimizes the decisions based on customer preferences and company economics. The method allows the companies to market a whole new paradigm of services and products surrounded around their original product offerings. This is achieved by unbundling formally bundled components of existing products, into components offered to the customer. This allows the customers to choose product features they wish to purchase and saves the company from making investments and costs in providing product components to those who don't want or desire those components.

In summary, it can be said this method accomplishes the following: (1) makes a business more attractive to customers by enabling customers to express their preferences; (2) makes a business more efficient and reduces costs; (3) allows a company to handle problems and disruptions in a quick, efficient manner to generate high customer satisfaction and keep their costs low; (4) helps a company to increase and strengthen its customer base, improve sales per customer, and customer retention, and (5) helps to increase the value customers gain from the purchased products.

In general, companies that will tend to benefit from this method will have numerous customers. They may also be characterized by one or more of the following: high-valued perishable products or services, high fixed-cost operations, and inventory that provides many issues (considerations or purchasing alternatives) for the purchaser. The following industries, at least, meet such a profile: airlines, hotels, automobiles, furniture, insurance, computer hardware, and travel (e.g., vacations, car rentals, cruises). There may be several other industries that may benefit by using the new system and method.

As a case in point, let us consider the airline industry. In order to reduce costs and increase operational efficiency, airlines have traditionally focused on optimizing within the boundaries of their internal operations. To increase revenues, airlines have employed indirect means of advertising, frequent flyer programs and blanket promotions, and have used gross demand based yield management systems to influence the customer demand indirectly at the gross level. End-customer demand has never been considered a factor that could be optimized to reduce costs or to increase revenues. End-customers have been treated as a distinct and detached entity, creating demand at a gross level, rather than as an integrated participant.

The above-discussed method concentrates on the overall value of the transaction for the parties involved, rather than simply on the specific product or service, and can optimize value across airline operation (i.e., costs, capacities and constraints) and passengers (i.e., demand, preferences and relative utilities) to maximize value for both.

Airlines have developed certain static on-demand solutions such as e-tickets, e-check-in, kiosks and Internet ticketing. These solutions speed up the processes and reduce costs but fail to integrate the customer in a dynamically optimized and more meaningful way. Under the here-in described method, the airline negotiates in real time with the customer and is able to estimate the airline's needs under optimal financial conditions (i.e., having the flexibility to achieve lowest cost, best utilization). Thus, the airline can alter demand by offering incentives or by modifying its offering to sell a seat that might otherwise go unfilled.

The new method allows an airline to accomplish some or all of the following:
  Attract more passengers at higher margins (revenue management)
  Offer better value-added services to customers (to increase yield, customer satisfaction, customer retention and customer base)
  Efficiently manage flight disruptions such as cancellations, delays and overbooking (to reduce disruption costs and avoid passenger dissatisfaction)
  Improve load balancing and operational efficiency (to reduce operational costs and increase margins)
  Improve security environment by reducing airport congestion and overcrowding (to reduce security delays and costs)

Currently, in the event of a flight cancellation or other disruption, customers barrage travel agents and airline telephone operators with calls, and flock to customer service desks where they are processed sequentially to satisfy customer needs, without much concern for the overall resulting cost. With the above-described method, the airline flight booking system is programmed in advance to deal automatically with re-bookings in the event of a disruption. Customers then can be processed automatically by the airline reservation system, based upon the participating customer's preference profile, selected incentive schedule, seat availability and seat cost. A new boarding pass and itinerary can be picked up at a kiosk in the airport. Human agents may still be needed to make adjustments for some customers, but the overall need for expensive customer service intervention is greatly reduced. Customers gain greater certainty in and control over their travel schedules and airlines avoid an overwhelming critical mass of customers standing in lines grumbling and generating while reducing costs.

Airlines and channel partners can use at least the following options to learn about customer demand and preferences and then integrate that data with their internal operations to maximize profits and revenues. The options for airlines are divided into three categories: (A) event management options, (B) accessory options, and (C) purchasing options. These options will now be described in detail.

(A) Event Management Options include (1) flight cancellation options, (2) flight delay options, (3) flight overbooking options, and (4) buy-back options.

(1) Flight Cancellation Options: Airlines can use a Flight Cancellation option to have the passenger express his/her preference in case of a flight cancellation. Currently, whenever a flight is cancelled, airlines face a costly, time-consuming task of rebooking all the passengers. They don't know which passengers absolutely have to travel that same day and which can wait, and so forth, until they have talked to almost all of them. That process takes time, resulting in longer queues, and anxious, frustrated, angry customers trying to get their situations resolved. Ultimately, the airline expends resources (staff, hotel, food, alternate flights on other airlines, overhead, transportation), loses revenue (to other airlines) and generates ill will in resolving that situation.

Using the method taught herein, the airline will encourage as many passengers as possible to express their preference and choose from different options regarding flight cancellation before their ticket purchases. (The actual number and types of options could vary. This is for example only.) The STS value options have been described in detail above, as well. Another set of STS value options is provided below. For example, the options shown in Table I could be available for a particular flight:

TABLE I

| S (i.e., Option) No. | Option Name | Option Description | Option Costs ($X) or Savings ($Y) for Customers |
| --- | --- | --- | --- |
| 1 | Next Flight | Get the next flight | $X_1$ |
| 2 | 4 Hr | Get a flight within 4 Hrs | $X_2$ |
| 3 | 8 Hr | Get a flight within 8 Hrs | $X_3$ |
| 4 | 8 Hr + Food Coupon | Get a flight within 8 Hrs and a Meal Voucher | $X_4$ |
| 5 | Same Day | Get a flight within the same day | $X_5$ |
| 6 | Same Day + Meal Voucher | Get a flight within the same day and a Meal Voucher | $X_6$ |
| 7 | 24 Hr + Meal and Hotel Voucher + Transport | Get a flight within 24 Hrs and Meal, Transport and Hotel Vouchers | $Y_1$ |
| 8 | 24 Hr | Get a flight within 24 Hrs | $Y_2$ |
| 9 | 48 Hr + Meal and Hotel Voucher + Transport | Get a flight within 48 Hrs and Meal, transport and Hotel Vouchers | $Y_3$ |
| 10 | 48 Hr | Get a flight within 48 Hrs | $Y_4$ |

Using the Table I options, the airline can achieve substantial benefit.

If a flight is cancelled, the airline will experience the following result. Passengers who chose options S=7, 8, 9, or 10 have already been given instructions in case of flight cancellation to return home and wait for the airline's email/fax or other notification of their alternative flights. So, these passengers simply leave the airport. Passengers with options S=1 to 6 simply go to a kiosk and print their new boarding passes. Once they have new boarding passes, these passengers proceed to their flights. A few passengers may have urgent needs (outside of options they had earlier selected). So a small queue of such passengers may be formed at the airport check in counter. The on-duty airline staff is sufficient to take care of these passengers within their normal work hours with no overtime paid, and no need for any additional staff. The airline will have generated additional revenue from those passengers who paid up front to buy options S=1 to 6 and it saved costs for passengers who elected options S=7-10, while increasing the satisfaction of all.

(2) Flight Delay Options: Similar to the above category, an airline can also experience flight delays, which may result in increased costs, ill will and dissatisfied customers. As in the case of flight cancellation explained above, an airline can make available the following options for flight delays and program their computers to fill orders starting with option S=1 and moving through increasing option numbers:

TABLE II

| S (i.e., Option) No. | Option Name | Option Description | Option Costs ($X) or Savings ($Y) for Customers |
| --- | --- | --- | --- |
| 1 | 1-2 Hr delay- Next Flight | Get the next flight if the original flight is delayed by 1-2 hrs | $X_1$ |
| 2 | 2-4 Hr delay- Next Flight | Get the next flight if the original flight is delayed by 2-4 hrs | $X_2$ |
| 3 | 4-6 Hr delay- Next Flight | Get the next flight if the original flight is delayed by 4-6 hrs | $X_3$ |
| 4 | More than 6 Hr delay- Next flight | Get the next flight if the original flight is delayed by more than 6 hrs | $X_4$ |
| 5 | Up to 12 Hr Delay- Regular and Food | Travel with the same flight if the flight is delayed by up to 12 Hrs and get food coupons. Alternate flight for more than 12 Hr delay | $X_5$ |

(3) Flight Overbooking Options: In case of flights being overbooked, an airline experiences problems in getting everybody on board, resulting in flight delays, increased costs, ill will and dissatisfied customers. As in the case of flight cancellation explained above, airlines can make available the options shown in Table III (or similar) for overbooking:

TABLE III

| S (i.e. Option No. | Option Name | Option Description | Option Costs ($X) or Savings ($Y) for Customers |
| --- | --- | --- | --- |
| 1 | Next Flight | In case of overbooking, airline can ask you to take the next flight | Save Y1 now and Y2 later if flight changes |
| 2 | 6 Hr | In case of overbooking, airline can ask you to take another flight within the next 6 hrs | Save Y3 now and Y4 later if flight changes |
| 3 | 24 Hr - Food and Hotel | In case of overbooking, airline can ask you to take another flight within 24 Hrs and provide food and hotel | Save Y5 now and Y6 later if flight changes |
| 4 | No-Overbook | You have the right to board the same flight: can't be asked to take another flight | X1 |

(4) Buy Back Options: Sometimes an airline can benefit by buying back booked tickets back from customers. For example, some customers may have more urgent need than others to get on that plane. Using the method taught herein, an airline can buy back tickets from some of its customers who had announced their schedule flexibility; those passengers might also be given a discounted ticket price. The airline could have the options of Table IV for buying the tickets back:

TABLE IV

| S (i.e. Option) No. | Option Name | Option Description | Option Costs ($X) or Savings ($Y) for Customers |
|---|---|---|---|
| 1 | 7 Day Buy- 1 Day Alternate | Airline can buy back the ticket up to 7 days before the travel date, and provide alternate flight within 1 day | Save Y1 now and Y2 later if event occurs |
| 2 | 3 Day Buy- 1 Day Alternate | Airline can buy back the ticket up to 3 days before the travel date, and provide alternate flight within 1 day | Save Y3 now and Y4 later if event occurs |
| 3 | 12 hrs Buy- 1 Day Alternate | Airline can buy back the ticket up to 12 hrs before the travel time and provide alternate flight within 1 day | Save Y5 now and Y6 later if event occurs |

(B) Accessory Options: An airline could make available accessory options to take advantage of the flexibility and needs of customers for their accessory needs.

(1) AlternateDate Option: Customers who are not sure about their travel dates could use this option to get confirmations on multiple, alternative flight dates. Once the customer has bought a confirmed flight, he/she can buy options for confirmed seats on other flights between the same cities on other dates, or between different cities on the same dates. This option would provide additional flexibility to passengers and generate additional revenue for airlines. Examples of some of these options are shown in Table V below:

TABLE V

| S (i.e. Option) No. | Option Name | Option Description | Option Costs ($X) or Savings ($Y) for Customers |
|---|---|---|---|
| 1 | Alternate Flight Confirmation - Diff. Date/2 Day | Get confirmation on the same flight for another date- Need to choose one at least 2 days before the earlier flight | Pay X1 now and X2 later if event occurs |
| 2 | Alternate Flight Confirmation - Diff. Flight/2 Day | Get confirmation on another flight on the same date - Need to choose one at least 2 days before the earlier flight | Pay X3 now and X4 later if event occurs |

(2) Modify Date Option: An airline could allow passengers to buy these options to maintain their flexibility to change their flight dates. Currently passengers have to pay a fixed, substantial fee for any changes they make on most flight fares. Using these options, a passengers can pick and choose the option that suits him/her the most. This option would provide additional flexibility to customers and generate additional revenue for the airline. Since these would be prices at low rates, more customers would be willing to pay for these options. Some examples of such options are shown in Table VI below:

TABLE VI

| S (i.e. Option) No. | Option Name | Option Description | Option Costs ($X) or Savings ($Y) for Customers |
|---|---|---|---|
| 1 | $X1- Fare Diff. Later | To get the option to change your flight: Pay $X1 now and Fare difference later when you change | Pay $X now and fare diff later if event occurs |
| 2 | $X2 - $X3 Later | To get the option to change your flight: Pay $X2 now and $X3 later when you change | Pay X2 now and X3 later if event occurs |
| 3 | $X4 Now | To get the option to change your flight: Pay $X4 now and you can make one change to your flight at no additional cost | Pay X4 now only |
| 4 | $X5 Now | Pay $X5 now and your ticket is 100% refundable | Pay X5 now only |
| 5 | $Zero Now- $X6 later | Pay nothing extra now and pay $X6 later if you want to make one change to your flight | Pay X6 later only if event occurs |
| 6 | Save $Y Now | Save $Y now and your ticket cannot be changed or refunded back | Save Y now |

(3) Luggage Options: Some passengers want to travel with very little, some with a lot of luggage. Passengers can use these options to save them costs and help airlines better manage their operations. Examples of some of these options are shown in Table VII below:

TABLE VII

| S (i.e. Option) No. | Option Name | Option Description | Option Costs ($X) or Savings ($Y) for Customers |
|---|---|---|---|
| 1 | Only 1 carry one piece | You can take only 1 carry-on piece (less than p pounds) with no checked in bags. | Save $Y1 now |
| 2 | 2 Check-in bags and 1 carry-on | You can take up to 2 check-in bags and 1 carry-on piece | No costs or benefits |
| 3 | 1 Additional Bag Option | You can take 1 additional check-in bag on top of 2 check-in bags and 1 carry-on piece | Pay X1 now and X2 later if event occurs |
| 4 | 2 Additional Bags Option | You can take 2 additional check-in bag on top of 2 check-in bags and 1 carry-on piece | Pay X3 now and X4 later if event occurs |

(4) Customer Service Options: Some passengers want to get more help from customer service than others. Those who commit to taking little or no additional help from the customer service center represent a cost-savings opportunity for the airline, which savings can be absorbed or shared with the passenger. An airline can offer a limited number of customer service options per each flight, to manage the airline's customer service center load. Passengers can use these options to save them costs and help the airlines better manage their operations. Some of these options are shown in Table VIII:

TABLE VIII

| S (i.e. Option) No. | Option Name | Option Description | Option Costs ($X) or Savings ($Y) for Customers |
|---|---|---|---|
| 1 | Online or Automated Customer Service only | You can take only online or automated customer service help and no live phone support is available | Save $Y1 now |
| 2 | Silver Phone Support | You can get basic live phone support and online support | No additional costs or benefits |
| 3 | Platinum Phone Support | You get superior live phone support (special 800 number) no wait time, plus online support | Pay X1 now |

(5) DirectFly Option: Direct flights (with no connection) between two cities are often priced quite a bit more than flights with one or more connections. For example, direct flight from Boston to Denver was priced over $500 round trip by three major shortly before the filing date hereof. On the other hand, flights with one or more connections were priced as low as $143 round trip for the same situation. Airlines adopt this practice to generate more revenue from people who value direct flights and are ready to pay a higher price for the same. Many times, this leads to the situation that airlines can't sell their direct flights fully as several people who cannot afford to pay $500 or more take connecting flights. A Direct-Fly Option (DFO) aims to solve this problem. Among the passengers who can't afford to pay $500 but who want to take direct flights, there are several who would pay maybe $200 or $250 (i.e., an amount higher than that charged for a connecting flight rate). The DFO helps to capture this additional revenue and provide better service to passengers. While buying connecting flight tickets, passengers are offered the DFO at particular price. If the direct flight does not get sold, then the airline provides the Direct Flight seat to a passenger who had chosen the DFO at a pre-determined cost (far lower than the normal direct flight price). Passengers may pay a very low price (for example, $1 or $2) initially to buy the option and may pay an increment such as $100 or so later, if the airline offers them a direct flight upgrade and the passenger decides to take it. The airline could let the passenger know some hours or a day before the intended departure time. Since there would be no guarantees to get the direct flight upgrade, a passenger who definitely wants to take a direct flight would not be likely to use DFO. There could be more aspects to developing this value option. For example, an airline may offer a probability associated with a DFO offer. For example, it might announce that if the passenger takes the option, there is a 30% chance that he would get the direct flight upgrade. To implement this forecasting, airline could use a software tool to calculate and keep track of an individual passenger who has bought a DFO previously to ensure that he gets a direct flight upgrade at least once in a predetermined number of times. Offering direct flights to passengers (who would have otherwise flown on connecting flights) would save an airline the cost of flying the passenger on fewer flights for the same trip, and generate higher revenues through option premiums. An example of a DFO is provided below.

TABLE IX

| S (i.e. Option) No. | Option Name | Option Description | Option Costs ($X) or Savings ($Y) for Customers |
|---|---|---|---|
| 1 | DirectFly Option | You may be offered to take direct flight between two cities if available provided you bought a connecting flight ticket between the same cities. You would be informed if a direct flight upgrade is available z hrs before the original departure time. | Pay $X1 now and $X2 later if direct flight is offered and accepted |

(6) TicketClassUpgrade Option: Similar to the DirectFly Option, is the TicketClassUpgrade (TCU) option. Business and First class seats are priced quite a bit high as compared to coach class seats. However, often business/first class seats are not filled completely as airlines can't find enough passengers to pay those high prices. However, there are several other passengers in lower ticket class segments who may be willing to pay extra (less than the normal difference between business and coach class seats) to take those vacant business class seats. Airlines can offer a TCU option to passengers when they buy coach class seats. Then if the business class seats are available up to a particular time before departure time, the airline could offer those seats to these passengers (who bought the TCU option) at a pre-determined price (which may be expressed in monetary or non-monetary terms, such as frequent flier miles). To restrict any misuse, an airline can put restrictions on the option and chose when to make this option available and at what price. The following scheme presents one particular example to implement this option:

TABLE X

| S (.i.e. Option) No. | Option Name | Option Description | Option Costs ($X) or Savings ($Y) for Customers |
|---|---|---|---|
| 1 | TicketClassUpgrade Option | You may be offered an upgrade to business/first ticket class between two cities if available provided you bought a coach/business ticket between the same cities. You would be informed if ticket class upgrade is available z hrs before the original departure time. | Pay $X1 now and $X2 later if ticket class upgrade is offered and accepted. |

(C) Purchase Options: These options may be used by an airline to cater to the different customer preferences and demand in purchasing their original tickets. Passengers with varying needs and flexibilities can choose the options that suit them the most and, in turn, increase efficiency and revenues and profits for the airline. Many categories of such options are possible, examples being expanded below in detail:

(1) Target Price Options: For passengers who are very flexible with their travel date, an airline may provide a target price option. Passengers select their preferred dates within a specific block of time and establishing relative utilities associated with their dates by setting a target price. If the target price is above a particular number, the airline accepts it. The Airline then comes back at least 2-3 times within that block of time with confirmed flights for passengers (e.g., 3 or 7 days before the flight time). Two types of target options are described in Table XI.

TABLE XI

| S (i.e. Option) No. | Option Name | Option Description | Option Costs ($X) or Savings ($Y) for Customers |
|---|---|---|---|
| 1 | Variable Target Price Range | You select preferred dates within a specific block of time, and provide your relative utilities with each date, a target price range (minimum Z dollar range). The airline confirms a flight within that target price range, on the preferred dates. You have the choice to take the flight or not. Airline gives you at least 2-3 confirmed flights with in your preferred dates and lets you know at least 3 or 7 days before the actual flight. | Pay $ 5-10 now and pay target price later if you want to take the flight |
| 2 | Fixed Target Price | You select preferred dates within a specific block of time, and provide a fixed target price. If airline accepts that price, you pay the price now. Then the airline comes back to you with a confirmed flight for that target price, on your preferred dates. You get only 2-3 chances and you have to accept one of them to not lose your money. Airline lets you know at least 7 days before the actual flight. You get flights at cheaper rate than the variable target price option. | Pay $ target price now only |

In each of the above option, whenever the airline presents to the passenger a confirmed flight at any particular time, the airline can also mention other alternate flights at slightly different prices and times, to increase the flexibility for the passenger.

(2) CyclicBuy Price Option: As discussed above, passengers who travel often between two particular cities can use these options to maximize their value. The passenger and airline enter into a pre-determined price agreement and the passenger uses the same airline to fly a particular number of times between two cities within a specified amount of times. The airline benefits from additional confirmed future revenues and profits. The passenger saves time and the headache of researching flight tickets each time he/she travels between those two cities. There are two exemplary types of cyclic buy price options described in Table XII.

TABLE XII

| S (i.e. Option) No. | Option Name | Name Description | Option Costs ($X) or Savings ($Y) for Customers |
|---|---|---|---|
| 1 | CyclicBuy - 7 day confirmation | Choose a time limit (3, 6 or 12 months), specify the number of flights you want to take. Airline gives you a good single price for all those flights. You can get a | Pay twice the cyclic price for the first flight and |

TABLE XII-continued

| S (i.e. Option) No. | Option Name | Name Description | Option Costs ($X) or Savings ($Y) for Customers |
|---|---|---|---|
| | | confirmed seat (up to 1/2 days before or after your travel date) if you let airline know at least 7 days in advance. You deposit advance of 1 ticket price with airline. | then pay the cyclic price with every flight. Don't pay anything for the last flight |
| 2 | CyclicBuy - 2 Day Confirmation | Choose a time limit (3, 6, 12 or more months), specify the number of flights you want to take. Airline gives you a good single price for all those flights. You can get a confirmed seat (up to 1/2 days before or after your travel date) if you let airline know at least 2 days in advance. You deposit advance of 1 ticket price with airline. | Pay twice the cyclic price for the first flight and then pay the cyclic price with every flight. Don't pay anything for the last flight |

Airlines might limit the second cyclical buy option to only selected groups of cyclic travel (for example with more than z flights in t amount of time).

(3) FutureBuy Price Option: An airline can make this option available to passengers who plan to take more than one flight within a specified time, to generate higher value for these passengers. Unlike the cyclic buy price option, above, the future buy price option does not require travel between the same cities. Passengers buy miles that can be used to travel on any route instead of a specific departure/destination route. Using this option, passengers can get better pricing, and save time and the headache of researching flight tickets each time they travel. Airlines benefit from additional confirmed future revenues and profits. There are two types of exemplary future buy price options described in Table XIII

TABLE XIII

| S (i.e. Option) No. | Option Name | Name Description | Option Costs ($X) or Savings ($Y) for Customers |
|---|---|---|---|
| 1 | Future Buy - 2T | You use this option for two tickets (one current and one future travel ticket). Specify the first flight you want to take. Specify travel cities (departure and destination) for future flight (within a specified time 3, 6 or 12 months). Airline gives you a good price for your current ticket and a price range for future flight. Get a confirmed seat on your future flight (up to 3 days before or after your intended travel date) if you let airline know at least 7 days in advance. You pay current ticket price and mid-value of future ticket price range at the start. | Pay Current ticket price and mid-value of future ticket price range now. Pay the difference of actual future ticket price later. |
| 2 | Future Buy - 2T Open Ticket | You use this option for two tickets (one current and one future travel ticket). Specify the first flight you want to take. | Pay Current ticket price and future ticket deposit now. |

TABLE XIII-continued

| S (i.e. Option) No. | Option Name | Name Description | Option Costs ($X) or Savings ($Y) for Customers |
|---|---|---|---|
| | (within regions) | Don't need to specify the future travel cities (timeline is required, within a specified time 3, 6 or 12 months). Airline gives you a good price for your current ticket and a deposit amount for future flight. Get a confirmed seat on your future flight (up to 3 days before or after your intended travel date) if you let airline know at least 10 days in advance. You pay current ticket price and deposit for future travel at the start. | Pay the difference of actual future ticket price later. |

An airline can limit the availability of these options to a select group of itinerary requests, to maximize the airline's returns.

(4) TIP (ticket-in-progress) Buy Price Option: An airline can present to passengers who are flexible enough to entertain delay in getting ticket and price confirmation for their travel plans an option to gain such benefits. Using this option, passengers can get better pricing, and save time and the headache of researching flight tickets each time they travel. The airline benefits by allocating profitable passengers to low-load factor flights, and from additional confirmed future revenues and profits. There are two types of TIP buy price options described in Table XIV.

TABLE XIV

| S (i.e. Option) No. | Option Name | Option Description | Option Costs ($X) or Savings ($Y) for Customers |
|---|---|---|---|
| 1 | TIP- 3 day | Submit your travel needs (cities, pref date) to the airline. Customers or airlines specifies a price range (which other party accepts) and airline guarantees travel within 1-2 day before or after your travel date. Airline will let you know 3 day before the actual flight the exact price and time of travel. You have the option to take the ticket or not. You pay a small dollar fee at the start and actual price if you take the flight. | Pay small $X1 at the beginning and actual price if the event occurs. |
| 2 | TIP- 7 day | Submit your travel needs (cities, pref date) to the airline. Customers or airlines specifies a price range (which other party accepts) and airline guarantees travel within 1-2 day before or after your travel date. Airline will let you know 7 day before the actual flight the exact price and time of travel. You have the option to take the ticket or not. You pay a small dollar fee at the start and actual price if you take the flight. | Pay small $X2 at the beginning and actual price if the event occurs. |

Airline Summary

An airline using the method and one or more options outlined above can improve profitability through some combination of increased load factor, revenue and cost reduction, while improving customer goodwill and creating predictable future business. Consider a flight Y on a future date D for that airline. Using this method, this airline would know some or all of the following about that flight:

For passengers who have already booked their tickets on flight Y on date D, the airline would know (a) booked passengers who definitely plan to take the Y flight and (b) booked passengers who are not sure if they would take the Y flight. For the remaining seats (un-booked) on the flight Y on date D, the airline would know (a) some of those potential passengers who have a plan to fly between similar cities (as flight Y) on Date D within price range $P1-$P2; (b) potential passengers who have a plan to fly between similar cities (as flight Y) on another date around Date D, within price range $P3-$P4; (c) potential passengers who don't have a plan yet to fly on Date D between similar cities (as flight Y) but could be motivated to take the flight Y if available at Price M; and (d) passengers, scheduled on a different flight, who would want to take the flight Y instead at an incremental Price Q (lower than current ticket change penalty).

The above represents just a sample of information and customer inventory that the airline would be able to generate. With the above information, the airline can then use this new method to maximize its load factor, revenue and profitability.

Using the above system and, an airline can optimize across customer demand and internal capacities to maximize its revenues and profitability. In other words, using this system and method, an airline can manage its customers, just like any other internal resource, to optimize its overall business processes Each company using the system and method taught herein can make its own choices as to how extensively to deploy the method. For example, an airline can implement as few or as many of the foregoing options as it desires; or it may perceive and implement one or more other options.

Similar options can be identified and pricing/service or product alternatives made available in other industries, such as the Hotels Industry, Car Rental and Cruises, and other travel industries as also mentioned in the above paragraphs.

This method of collecting customers' advanced and ongoing preferences and including these preferences (and perhaps intentions and plans) into the optimization process is fundamentally different from other business methods used currently, namely customization, build to order, build to stock or any other conventional business method. Focus groups or surveys have been used to formulate new programs but without similar impacts or ability to provide dynamic customization and optimization. Though history is of value, it is no substitute for "current" preferences at the time the customer is shopping. Integrating customer preferences with company economics (formally and in real-time) permits optimization of returns for both customers and the company. The above-described system and method enables companies to interact and optimize business transactions with large numbers of customers, while treating each as an individual.

While the invention has been described with respect to a limited number of embodiments, those skilled in the art, having benefit of this disclosure, will appreciate that other embodiments can be devised which do not depart from the spirit and scope of the invention as disclosed herein. Accordingly, the scope of the invention should be limited only by the attached claims.

What is claimed is:

1. A method for concurrent enhancement of value in a transaction between at least two entities, comprising:
   a. (1) dynamically receiving input defining multiple customers' needs and preferences with respect to a product offering of a business, (2) determining the customers' preferences with respect to at least one product offering of the business; and (3) storing the determined customer preferences in a structured manner in a computer accessible database, wherein steps (1)-(3) are performed using a Customer Engine module;

b. creating, by a computer processor, executing stored program instructions configuring the processor as a module, termed a Value Option Creator module, Value Option Frameworks, and formulating corresponding multiple types of value options for said business that can be offered to customers while enhancing the business's operations, in consideration of said determined customer preferences;

c. receiving from customers inputs representing purchase selections of value options;

d. on a computer processor, executing stored program instructions configuring the processor as a module, termed an Event Optimizer module, monitoring business operational information and executing event algorithms related to the types of value options which customers have purchased, the Event Optimizer module further invoking pre-designed protocols on occurrences of predetermined events associated with said option types;

e. dynamically integrating said preferences with the economics of said business using said Event Optimizer module; and f. concluding a sale of the product, whereby concluding the sale thereby enhances both the customer's purchase utilities expressed in said preferences and the business's profitability with respect to its sales.

2. The method of claim 1, wherein the Customer Engine module is part of one or more web sites or call centers.

3. The method of claim 1, wherein a Value Option Framework a provides at least one option to a customer according to which the customer may choose n out of m selected products, where n is less than or equal to m and the customer defines at least one of the n chosen products.

4. The method of claim 1, wherein a Value Option Framework provides at least one option to a customer according to which the customer may choose n out of m selected products, where n is less than or equal to m and an entity other than the customer defines at least one of the n chosen products and after each of said n chosen products are defined, the customer can utilize said chosen products.

5. The method of claim 1, wherein a Value Option Framework provides at least one option to a customer according to which the customer may express a preference desired if a specified event or type of event occurs.

6. The method of claim 1, wherein a Value Option Framework provides at least one option to the business according to which the business may buy back some of the products already selected by the customer.

7. The method of claim 1, wherein a Value Option Framework provides at least one option to a customer according to which the customer may choose a single product providing similar value instead of a plurality of products.

8. The method of claim 7, wherein said Value Option Framework provides at least one option according to which a customer booked on connecting flights may choose a direct flight, instead.

9. The method of claim 1, wherein a Value Option Framework provides at least one option to a customer according to which the customer may choose a higher ranked product.

10. The method of claim 1, wherein a Value Option Framework provides at least one option to a customer according to which the customer may provide the customer's preferences within a designated framework and establish relative utilities associated with those preferences by setting a target value.

11. The method of claim 1, wherein a Value Option Framework provides at least one option to a customer according to which the customer may enter into a pre-determined agreement and the customer utilizes the products of the same business within a specified parameter.

12. The method of claim 11, wherein said specified parameter includes a specified time period.

13. The method of claim 11, wherein said specified parameter includes a specified quantity.

14. The method of claim 1, wherein a Value Option Framework provides at least one option according to which the customer may utilize n out of m products, where:

a. n is less than m; and b. m is equal to or greater than 2.

15. The method of claim 14, wherein said utilization is governed by a pre-determined agreement.

16. The method of claim 14, wherein said utilization must occur within a specified time period.

17. The method of claim 1, wherein a Value Option Framework provides at least one option according to which a customer may accept a delay in the delivery of a product in exchange for compensation.

18. A system for concurrent enhancement of value in a transaction between a business entity and customers of the business entity, comprising:

at least one memory storing program instructions;

one or more processors configured to execute said program instructions, said one or more processors configured to:

a. (1) dynamically receive input defining multiple customers' needs and preferences with respect to a product offering of a business, (2) determine the customers' preferences with respect to at least one product offering of the business; and (3) store the determined customer preferences in a structured manner in a computer accessible database;

b. create Value Option Frameworks and formulate corresponding multiple types of value options for said business that can be offered to customers while enhancing the business's operations, in consideration of said determined customer preferences;

c. receive from customers inputs representing purchase selections of value options;

d. monitor business operational information, execute event algorithms related to the types of value options which customers have purchased, and invoke pre-designed protocols on occurrences of predetermined events associated with said option types;

e. dynamically integrate said preferences with the economics of said business using; and f. conclude a sale of the product, whereby concluding the sale thereby enhances both the customer's purchase utilities expressed in said preferences and the business's profitability with respect to its sales.

19. The system of claim 18, wherein the Customer Engine module is part of one or more of a web site and a call center.

* * * * *